(12) United States Patent
Gorbachov et al.

(10) Patent No.: US 9,143,184 B2
(45) Date of Patent: Sep. 22, 2015

(54) RADIO FREQUENCY MULTI-PORT SWITCHES

(75) Inventors: Oleksandr Gorbachov, Irvine, CA (US); Okjune Jeon, Irvine, CA (US); Taewon Jung, Irvine, CA (US)

(73) Assignee: RFAXIS, INC., Irvine, CA (US)

( * ) Notice: Subject to any disclaimer, the term of this patent is extended or adjusted under 35 U.S.C. 154(b) by 852 days.

(21) Appl. No.: 13/273,529

(22) Filed: Oct. 14, 2011

(65) Prior Publication Data

US 2012/0262217 A1 Oct. 18, 2012

Related U.S. Application Data

(60) Provisional application No. 61/394,455, filed on Oct. 19, 2010.

(51) Int. Cl.
*H01P 1/15* (2006.01)
*H04B 1/48* (2006.01)

(52) U.S. Cl.
CPC ... *H04B 1/48* (2013.01); *H01P 1/15* (2013.01)

(58) Field of Classification Search
USPC ........ 333/101, 124, 112; 455/84, 78, 552, 83; 370/280; 330/283
See application file for complete search history.

(56) References Cited

U.S. PATENT DOCUMENTS

| 6,108,313 | A | 8/2000 | Lee et al. |
| 6,937,845 | B2 | 8/2005 | Watanabe et al. |
| 6,977,552 | B2 | 12/2005 | Macedo |
| 7,315,730 | B2 | 1/2008 | Galan |
| 8,005,504 | B2 | 8/2011 | Sano et al. |
| 2004/0209584 | A1 | 10/2004 | Bargroff et al. |
| 2004/0214530 | A1 | 10/2004 | Brandt et al. |
| 2006/0045202 | A1 | 3/2006 | Rafi et al. |
| 2006/0068730 | A1 | 3/2006 | Khorram |
| 2007/0213015 | A1* | 9/2007 | Nagano et al. .................. 455/83 |
| 2007/0222697 | A1 | 9/2007 | Caimi et al. |
| 2007/0232241 | A1 | 10/2007 | Carley et al. |
| 2008/0089252 | A1 | 4/2008 | Choi |
| 2008/0159458 | A1 | 7/2008 | Cheng et al. |
| 2008/0279262 | A1 | 11/2008 | Shanjani |
| 2009/0029654 | A1* | 1/2009 | Fu et al. ......................... 455/83 |

(Continued)

FOREIGN PATENT DOCUMENTS

WO 2008/002697 3/2008

OTHER PUBLICATIONS

Atmel: Bluetooth Front-end IC T7024 Design Guide; Jun. 2004; 18 pages.

(Continued)

*Primary Examiner* — Stephen E Jones
(74) *Attorney, Agent, or Firm* — Stetina Brunda Garred & Brucker

(57) ABSTRACT

A multiport radio frequency (RF) switch circuit is disclosed. The switch circuit includes a first transistor that is connected to a first port, a common antenna port, and a first enable line. The first transistor is selectively activatable in response to a first enable signal applied to the first enable line. There is also a second transistor connected to a second port, the common antenna port, and a second enable line. The second transistor is selectively activatable in response to a second enable signal applied to the second enable line. A first inductor connected to the first port and the second port compensates for parasitic capacitance between the first port and the second port from an inactive one of the transistors.

30 Claims, 30 Drawing Sheets

(56) References Cited

U.S. PATENT DOCUMENTS

| | | |
|---|---|---|
| 2009/0036065 A1 | 2/2009 | Siu |
| 2009/0167627 A1 | 7/2009 | Breiter |
| 2009/0207764 A1 | 8/2009 | Fukamachi et al. |
| 2009/0298443 A1 | 12/2009 | Ta et al. |
| 2010/0117727 A1 | 5/2010 | Dawson et al. |

OTHER PUBLICATIONS

Atmel: Integrated SiGe Front-end RF ICs;2003, 2 pages.
Atmel: 5-GHz WLAN Power Amplifier for 802.11a, ATR3515 Preliminary; 2004, 7 pages.
Atmel: High Gain Power Amplifier for 802.11b/g WLAN Systems, ATR7032 Preliminary; 2006, 15 pages.
Atmel: ZigBee IEEE 802.15.4 Radio Transceiver; AT86RF230, Preliminary; 2007, 82 pages.
ANADIGICS: AWM6430; 3.5 GHz WiMAX Power Amplifier Module, Advanced Product Information—Rev. 0.1; Jan. 2005; 12 pages.
Broadcom; BCM4328 Product Brief; Air Force One Single-Chip IEEE 802.11a/b/g MAC/Baseband/Radio With Integrated CPU; Dec. 5, 2006; 2 pages.
Broadcom; BCM4326 Product Brief; Air Force One Single-Chip IEEE 802.11b/g MAC/Baseband/Radio With Integrated CPU; Dec. 5, 2006; 2 pages.
Broadcom: BCM94318 Product Brief: Airforce One Chip 802.11 Reference Design; Oct. 7, 2004; 2 pages.
Xin He, Fully Integrated Transceiver Design in SOI Processes, a Dissertation, Kansas State University, 2004, 129 pages.
Maxim: Industry's First Ultra-Low-Power, 802.11g/b RF Transceiver to Integrate PA, Rx/Tx/Antenna Diversity Switches, and Crystal Oscillator Circuitry; Apr. 30, 2008; 2 pages.
Maxim: MAX2830 Industry's First802.11G/B RF Transceiver with Integrated PA, Rx/Tx and Antenna Switches; Apr. 30, 2008; 3 pages.
Meshnetics: ZigBit Amp OEM Modules; ZDM-A1281-PN/PNO (MNZG-A24-UFL/UO) Revision 2.2; Ultra-Compact 2.4GHz 802.15.4/ZigBee Modules with Power Amplifier for Wireless Networking Applications; Oct. 2008, 18 pages.
Meshnetics M2M-100-2008: ZigBit Amp Module; 2.4 GHz Amplified Modules for IEEE 802.15.4/ZigBee Wireless Mesh Networking Applications; 2008; 2 pages.
Meshnetics: ZigBit Amp OEM Modules ZDM-A1281-PN/PNO Revision 2.1; Ultra-Compact 2.4GHz 802.15.4/ZigBee Modules with Power Amplifier for Wireless Networking Applications; Dec. 2007, 15 pages.
Murata MF2400PJ-SF0702; PA MMIC for 2.4GHz Wireless Communication; Jan. 18, 2003; 11 pages.
CEL; GaAs Integrated Circuit PG2250T5N; 1.8 V, Power Amplifier for Bluetooth Class 1; NEC Electronics Corp.; 2006, 12 pages.
CEL NEC's Power Amplifier for Bluetooth Class 1: UPG2301TQ Data Sheet; Feb. 4, 2004; 7 pages.
CEL: GaAs HBT Integrated Circuit PG2314T5N: Power Amplifier for Bluetooth Class 1; Jul. 2006, 10 pages.
CEL Application Note: AN1048 UPG2150T5L Switch; Sep. 29, 2005, 1 page.
CEL California Eastern Laboratories: AN1049 UPG2314T5N HBT PA IC for Bluetooth and ZigBee; Oct. 17, 2006; 5 pages.
RT2501 Wireless Chipset 802.11 b/g solution featuring Packet-OVERDIRVE Technology; Ralink Technology Corp; 2006, 1 page.
RT2501U; USB2.0 Wireless Chipset 802.11 b/g solution featuring Packet-OVERDIRVE Technology; Ralink Technology Corp., 2006, 1 page.
RT2600 MIMO XR Wirless Chipset 802.11b/g solution featuring Packet-OVERDRIVE and Range-OVERDIRVE Technologies; Ralink Technology Corp; 2006, 1 page.
RT2700 MIMO Wireless Chipset Family; 802.11n Solution featuring MIMObility Technology; Ralink Technology Corp; 2006, 2 pages.
RT2800 MIMO Wireless Chipset Family 802.11n Solution featuring MIMObility Technology; Ralink Technology Corp; 2006, 2 pages.
RT5201 Wireless Chipset 802.11 a/b/g solution featuring Packet-OVERDIRVE Technology; Ralink Technology Corp; 2006, 1 page.
RT5201U USB 2.0 Wireless Chipset 802.11 a/b/g solution featuring Packet-OVERDIRVE Technology; Ralink Technology Corp; 2006, 1 page.
RT5600 MIMO XR Wireless Chipset 802.11 a/b/g solution featuring Packet-OVERDIRVE and Range-OVERDIRVE Technologies; Ralink Technology Corp; 2006, 1 page.
Agnelli, Federico, et al; Wireless Multi-Standard Terminals: System Analysis and Design of a Reconfigurable RF Front-end; IEEE Circuits and Systems Magazine; First Quarter 2006; p. 38-59.
Cutler, Tim; ZigBee: RF power options in ZigBee solutions; Emerging Wireless Technology/A Supplement to RF Design; www.rfdesign.com; Mar. 2006; p. 18-21.
Richwave RTC6682 VO.3 Data Sheet; www.richwave.com.tw; Aug. 2006; 7 pages.
WLAN WiMAX PA & FEM Market, Feb. 12, 2009; 158 page presentation.
Cirronet ZigBee High Power Module ZMN2405HP; Oct. 28, 2007; 6 pages.
Cirronet ZigBee High Power Module ZMN2430HP; Oct. 28, 2007; 6 pages.
Design of a Dual Band Wireless LAN SiGe-Bipolar Power Amplifier; from Sep. 2004 High Frequency Electronics; 8 pages.
EPCOS WLAN Modules Preliminary Datasheet R041_M01; Jun. 20, 2006; 14 pages.
Ember Datasheet; EM2420 2.4 GHz IEEE 802.15.4 / ZigBee RF Transceiver; Copyright 2003, 2004 by Ember Corporation; 89 pages.
Free2Move Class 1 Bluetooth Module—F2M03C1 Datasheet; Rev. 13 Sep. 2005; 46 pages.
Freescale Semiconductor Technical Data Document No. MC13191/D; Rev. 1.2 Apr. 2005; MC13191: 2.4 GHz ISM Band Low Power Transceiver; 24 pages.
Freescale Semiconductor Technical Data Document No. MC13192; Rev. 3.2 May 2007; MC13192: 2.4 GHz Low Power Transceiver for the IEEE 802.15.4 Standard; 24 pages.
Freescale Semiconductor; MC13191: 2.4 GHz Low Power Transceiver for the IEEE 802.15.4 Standard; Reference Manual; Document No. MC13191RM; Rev. 1.2; Apr. 2005; 92 pages.
Freescale Semiconductor Technical Data; Document No. MC13192; Rev. 2.8, Apr. 2005; MC13192/MC13193: 2.4 GHz Low Power Transceiver for the IEEE 802.15.4 Standard; 23 pages.
Freescale Semiconductor MC13192/MC13193: 2.4 GHz Low Power Transceiver for the IEEE 802.15.4 Standard; Reference Manual; Rev. 1.3 Apr. 2005; 111 pages.
California Eastern Laboratories; ZIC2410 Datasheet; Rev. A; Document No. 0005-05-07-00-000; Jun. 20, 2008; 119 pages.
CEL Preliminary Data Sheet; Apex & Apex LT Series Transceiver Modules; ZAXM-201-1, ZALM-301-1; May 7, 2008; 17 pages.
CEL Preliminary Data Sheet; Freestar Series Transceiver Module; ZFSM-101-1; May 7, 2008; 10 pages.
CEL Preliminary Data Sheet; Matrix Transceiver Modules; ZMXM-400 Series; May 7, 2008; 12.
J. Trachewsky, et al.; Broadcom WLAN Chipset for 802.11a/b/g; Broadcom Corporation, CA, USA; Aug. 17, 2003; 42 pages.
ANADIGICS; AWL6254; 1.4 GHz 802.11b/g/n; WLAN PA, LNA, and RF Switch Data Sheet—Rev 2.0; Feb. 2008; 16 pages.
ANADIGICS; AWM6430; 3.3-3.6 GHz Power Amplifier Module; Preliminary Data Sheet; Rev 1.0; Jan. 2006; 12 pages.
Zhang, Weimin; A Low Voltage Fully-Integrated 0.18um CMOS Power Amplifier for 5GHz WLAN; Institute of Microelectronics, Singapore; 2002; 4 pages.
Copeland, Miles A.; 5-GHz SiGe HBT Monolithic Radio Transceiver with Tunable Filtering; IEEE Transactions on Microwave Theory and Techniques, vol. 48 No. 2, February 1000, 12 pages.
Atherso: AR3011—ROCm Solutions for Bluetooth; Radio-On-Chip for Mobile (ROCm) Products; Jan. 22, 2008; 2 pages.
Atheros: AR3000—ROCm Solutions for Bluetooth Radio-On-Chip for Mobile (ROCm) Products; Jan. 22, 2008; AR3031; 2 pages.
Atheros: ROCm Platform; Radio-On-Chip for Mobile (ROCm; AR6001GL; Embedded 802.11b/g Solution for Mobile and Battery-Operated Devices; 2006; 2 pages.
Atheros; AR6002 Breaking the Power Barrier in Mobile WiFi; Aug. 28, 2008; 2 pages.

(56) References Cited

OTHER PUBLICATIONS

Atheros: AR6001GL; Embedded 802.11b/g Solution for Mobile and Battery-Operated Devices; 2006; 2 pages.
Atheros; AR6001XL; Embedded 802.11a/b/g Solution for Mobile and Battery-Operated Devices; 2006; 2 pages.
Atheros; AR6101G; World's Most Integrated, Cost-Effective Single-Chip WLAN Handset Design Brings Voice-Over-WiFi to the Mainstream; 2006; 2 pages.
Atheros; AR9285 Single-chip PCIe based on 802.11n 1-stream specification; Oct. 28, 2008; 2 pages.
Atheros; AR9002AP-1S; AP/Router solution based on 802.11n 1-stream specification; Oct. 28, 2008; 2 pages.
California Eastern Laboratories Fully-Integrated RF Transceiver System-on-Chip For ZigBee/IEEE 802.15.4 Applications Announced; California Eastern Laboratories, Aug. 6, 2008; 2 pages.
Patent Cooperation Treaty International Search Report for PCT/US 11/56408; mailed Feb. 29, 2012; 10 pages.
SiGe PA Enables Smallest System Footprint For Embedded WLAN; Semiconductor Online; Dec. 15, 2008; 3 pages.
Skyworks: SKY65336: 2.4 GHz Transmit/Receive Front-End Module with Integrated LNA; Skyworks Solutions, Inc.; Aug. 20, 2008; 2 pages.
Skyworks; SKY65337: 2.4 GHz Transmit/Receive Front-End Module; Skyworks Solutions, Inc.; Aug. 20, 2008; 2 pages.
Skyworks; SKY65241-12: WLAN 802.11a, b, g, n Dual-Band Intera Front-End Module Single Antenna; Skyworks Solutions, Inc.; Mar. 12, 2008; 9 pages.
Skyworks; SKY65243-11: WLAN 802.11a, b, g, n Dual-Band Intera Front-End Module Dual Antennas; Skyworks Solutions, Inc.; Mar. 12, 2008; 8 pages.
Skyworks; SKY65256-11: WLAN 802.11a, b, g, n Dual-Band Front-End Module Single Antenna; Skyworks Solutions, Inc.; Sep. 28, 2007; 10 pages.
Skyworks; SKY65228-11: WLAN 802.11n Single Band 4.9-5.85 GHz MIMO Intera Front-End Module; Skyworks Solutions, Inc.; Oct. 9, 2007; 9 pages.
Skyworks; SKY65206-13: WLAN 802.11b/g Intera Front-End Module; Skyworks Solutions, Inc.; Aug. 21, 2007; 7 pages.
Skyworks; SKY65249-11: WLAN 802.11b, g, n Intera Front-End Module; Skyworks Solutions, Inc.; Nov. 30, 2007; 9 pages.
Skyworks; SKY65227-11: WLAN 802.11n Single Band Intera 2.4 GHz MIMO Intera Front-End Module; Skyworks Solutions, Inc.; Oct. 9, 2007; 9 pages.
Skyworks; SKY65230-11: WLAN 802.11 n 2×2 MIMO Intera Front-End Module with 3 Antenna Ports; Skyworks Solutions, Inc.; Oct. 9, 2007; 13 pages.
Skyworks; SKY65225-11: WLAN 802.11n 2×2 MIMO Intera Front-End Module; Skyworks Solutions, Inc.; May 7, 2007; 11 pages.
Skyworks; SKY65135: WLAN Power Amplifier; Skyworks Solutions, Inc.; Mar. 26, 2007; 13 pages.
Skyworks; SKY65209: WLAN 802.11b/g Front-End Module; Skyworks Solutions, Inc.; Jan. 18, 2006; 8 pages.
4.9-5.8 GHz High-Linearity Power Amplifier SST11LP11; SST Communications Corp; 2005, 14 pages.
4.9-5.8 GHz High-Linearity Power Amplifier SST11LP12; SST Communications Corp; 2005, 14 pages.
2.4 GHz Power Amplifier SST12LP00; SST Communications Corp; 2005, 9 pages.
2.4 GHz High-Linearity Power Amplifier SST12LP10; SST Communications Corp; 2005, 12 pages.
2.4 GHz Power Amplifier SST12LP14; SST Communications Corp; 2005, 12 pages.
2.4 GHz High-Power, High-Gain Amplifier SST12LP15; SST Communications Corp; 2005, 12 pages.
2.4 GHz High-Power, High-Gain Amplifier SST12LP15A; SST Communications Corp; 2005, 12 pages.
STLC2500C: Bluetooth EDR Single Chip Data Brief; STMicroelectronics; Jan. 2006, 4 pages.
STLC4550: Single Chip 802.11b/g WLAN radio Data Brief; STMicroelectronics; Feb. 2006, 5 pages.
ZigBee—compliant wireless control and sensoring network solutions; STMicroelectronics; Jun. 2006; 8 pages.
Amin, Yasar, et al; Integration of Passives for Receiver Front-End for 5GHz Wireless LAN Applications; Royal Institute of Technology, Sweden & U of Engineering & Tech, Taxila, Pakistan; 2004; p. 24-29.
Texas Instruments: CC2591; 2.4-GHz RF Front End, data sheet, Jun. 2008, Texas Instruments, Inc. 18 pages.
Texas Instruments: CC2436; High-Power Dual-Band (2.4-GHz and 4.9-GHz to 5.9-GHz) RF Front End, data sheet, May 2007; Texas Instruments, Inc. 15 pages.
Hoppenstein, Russell; High-Performance WiMAX RF Chipset Enable CPE and BTS Applications; Texas Instruments Inc.; Oct. 20, 2006.
Texas Instruments: Technology for Innovators: WiLink 4.0 single-chip mobile WLAN solutons Product Bulletin; 2006 Texas Instruments Inc., 2 pages.
Chipcon Products from Texas Instruments: CC2420; 2.4 GHz IEEE 802.15.4 / ZigBee-ready RF Transceiver; 2008, Texas Instruments Inc., 89 pages.
Chipcon Products from Texas Instruments: CC2430; A True System-on-Chip solution for 2.4 GHz IEEE 802.15.4 / ZigBee; 2007, Texas Instruments Inc., 212 pages.
Texas Instruments: CC2520 Datasheet; 2.4 GHz IEEE 802.15.4/ SIZBEE RF Transceiver; Dec. 2007; Texas Instruments Inc.; 2007; 128 pages.
Zheng, Shaoyong, et al.; Distributed Power Amplifier/Feedback Low Noise Amplifier Switch-Less Front-End; Dept. Electronic Engineering, City University of Hong Kong, Feb. 8, 2006, p. 1659-1662.
Masse, Cecile; Analog/RF Front End; A direct-conversion transmitter for WiMAX and WiBro applications; www.rfdesign.com ; Jan. 2006, 3 pages.
XBEE OEM RF Modules; ZigBee / 802.15.4 OEM RF Modules by MaxStream, Inc. Specifications; MaxStream, Inc., 2005, 2 pages.
Fanucci, L, et al.; A Novel Fully Integrated Antenna Switch for Wireless Systems; Pisa, Italy, Sep. 16, 2003; 4 pages.
RFMD: Mobile Computing: Front End Module Portfolio; rfmd.com; 2009, 2 pages.
Maxim: Application Note 686; QPSK Modulation Demystified; May 1, 2002; 7 pages.

\* cited by examiner

RADIO FREQUENCY MULTI-PORT SWITCHES

CROSS-REFERENCE TO RELATED APPLICATIONS

This application relates to and claims the benefit of U.S. Provisional Application No. 61/394,455 filed Oct. 19, 2010 and entitled "RF MOS MULTI-PORT SWITCHES," the entire contents of which are wholly incorporated by reference herein.

STATEMENT RE: FEDERALLY SPONSORED RESEARCH/DEVELOPMENT

Not Applicable

BACKGROUND

1. Technical Field

The present invention relates generally to radio frequency (RF) devices. More particularly, the present invention relates to RF multi-port switches.

2. Related Art

Complex, multi-function electronic devices are comprised of many interconnected modules and components, each of which serves a dedicated purpose. As a general example, wireless communication devices may be comprised of a transmit chain and a receive chain, with the antenna and the transceiver circuit being a part of both the transmit chain and receive chain. The transmit chain may additionally include a power amplifier for increasing the output power of the generated RF signal from the transceiver, while the receive chain may include a low noise amplifier for boosting the weak received signal so that information can be accurately and reliably extracted therefrom.

The low noise amplifier and the power amplifier may together comprise a front end module or front end circuit, which also includes an RF switch circuit that selectively interconnects the power amplifier and the low noise amplifier to the antenna. The connection to the antenna is switched between the receive chain circuitry, i.e., the low noise amplifier and the receiver, and the transmit chain circuitry, i.e., the power amplifier and the transmitter. In time domain duplex communications systems where a single antenna is used for both transmission and reception, this switching between the receive chain and the transmit chain occurs rapidly many times throughout a typical communications session. Besides RF communications systems, switches and switch circuits find application in many other contexts.

The RF switches and the amplifier circuits of the front end module are manufactured as an integrated circuit. In high-power applications such as GSM (Global System for Mobile communications) handsets, WLAN (wireless local area networking) client interface devices and infrastructure devices, the integrated circuits are typically manufactured with a GaAs (gallium arsenide) semiconductor substrate. The SOI (silicon-on-insulator) process has also found use in RF switch circuit applications, though spurious emissions due to the necessity of charge pumps can adversely affect receive chain sensitivity in many communication systems. Good insertion loss and isolation are possible with both GaAs and SOI processes, but manufacturing costs tend to be higher in comparison to more conventional semiconductor technologies such as the CMOS (Complementary Metal Oxide Semiconductor) process. There have been several attempts to implement RF switches on the CMOS process, but only low power devices have been realized thus far. This is, in part, due to the parasitic capacitance of transistors and low substrate resistance of bulk semiconductor wafers used in the CMOS process. Accordingly, high isolation and linearity at large signal levels have been difficult to achieve.

An RF switch has several performance parameters, including insertion loss, isolation, return loss, and linearity. Insertion loss refers to the power lost in the RF switch, and is expressed in dB. It is defined by Pout−Pin (dB), where Pin is the input power applied to the RF switch, and Pout is the power at the output port of the RF switch. Isolation refers to the measure of signal attenuation, expressed in dB, between the active signal port and the inactive signal port. Additionally, return loss refers to the measure of input and/or output matching conditions, and is expressed in dB. Linearity, or power handling capability, is the capability of the RF switch to minimize distortion at high power output levels and is expressed in dBm. It is typically represented by the 1 dB compression point (P1 dB), or the point at which insertion loss is degraded by 1 dB.

Accordingly, there is a need in the art for improved RF multi-port switches, whether single pole-double throw, single pole-triple throw, dual port-dual throw, or any other switch type. Furthermore, there is a need in the art for RF multi-port switches that can be implemented on CMOS substrates or any other semiconductor technology while minimizing insertion loss, return loss, and spurious emissions, and maximizing isolation and linearity even at low control and bias voltages.

BRIEF SUMMARY

The present disclosure contemplates a radio frequency (RF) switch circuit with a first port, a first enable line, a second port, a second enable line, and a common antenna port. The switch circuit may include a first transistor that is connected to the first port, the common antenna port, and the first enable line. The first transistor may be selectively activatable in response to a first enable signal applied to the first enable line. The switch circuit may also include a second transistor that is connected to the second port, the common antenna port, and the second enable line. The second transistor may be selectively activatable in response to a second enable signal applied to the second enable line. There may also be a first inductor connected to the first port and the second port.

The first inductor may compensate for parasitic capacitance between the first port and the second port from an inactive one of the first and second transistors. The first inductor may phase shift a first signal on the first port that is applied to the second port. With the first transistor being activated and the second transistor being deactivated, a leakage of the first signal through the second transistor on the second port being may be minimized by the phase shifted first signal. Furthermore, the capacitive impedance of the second transistor may be tuned with inductive impedance of the first inductor at a first operating frequency to generate a parallel resonance isolating the first port from the second port. The activated first transistor may be defined by a first equivalent resistance and a first equivalent capacitance, and the deactivated second transistor may be defined by a second equivalent resistance and a second equivalent capacitance. In turn, the first inductor may have a value selected to define a resonance together with the second equivalent capacitance at a first operating frequency.

Another embodiment of the present disclosure contemplates an RF single pole, triple throw switch circuit with a first port, a first enable line, a second port, a second enable line, a third port, a third enable line, and a common antenna port. The switch circuit may include a first transistor connected to the first port, the common antenna port, and the first enable line. The first transistor may be selectively activatable in response to a first enable signal applied to the first enable line. There may also be a second transistor that is connected to the second port, the common antenna port, and the second enable line. The second transistor may be selectively activatable in response to a second enable signal applied to the second enable line. Furthermore, a third transistor may be connected to the third port, the common antenna port, and the third enable line. The third transistor may likewise be selectively activatable in response to a third enable signal applied to the first enable line. The switch circuit may also include a first inductor connected to the first port and the third port to compensate for parasitic capacitance from the second port and the third port from an inactive one or more of the first, second and third transistors. Additionally there may be a second inductor that is connected to the first port and the second port to compensate for parasitic capacitance between the first port and the second port from an inactive one or more of the first, second and third transistors. There may also be a third inductor that is connected to the second and the third port to compensate for parasitic capacitance between the first port and the second port from an inactive one or more of the first, second and third transistors.

An RF double pole, double throw switch circuit is contemplated in accordance with another embodiment of the present disclosure. The switch circuit may have a first port, a first enable line, a second port, a second enable line, a first antenna port, a third enable line, a second antenna port, and a fourth enable line. There may be a first switching segment that includes a first transistor, a first segment junction connected to the transistor, a second transistor, and a second segment junction connected to the second transistor. The first transistor may be connected to the first port and the first enable line, and may be selectively activatable in response to a first enable signal applied to the first enable line. The second transistor may be connected to the second port and the second enable line, and may be selectively activatable in response to a second enable signal applied to the second enable line.

The switch circuit may also include a second switching segment with a third transistor and a fourth transistor. The third transistor may be connected to the first antenna port, the first segment junction, and the third enable line. The third transistor may be selectively activatable in response to a third enable signal that is applied to the third enable line. The fourth transistor may be connected to the second antenna port, the second segment junction, and the fourth enable line. The fourth transistor may be selectively activatable in response to a third enable signal applied to the third enable line.

Furthermore, the switch circuit may include a first inductor connected to the first port and the second port to compensate for parasitic capacitance from the first port and the second port from an inactive one of the first and second transistors. There may also be a second inductor that is connected to the first port and the second port to compensate for parasitic capacitance between the first port and the second port from an inactive one or more of the third and fourth transistors.

A first signal on the first port may be selectively passed to the first antenna port and the second antenna port by activating the first transistor and one of the third transistor and the fourth transistor.

A second signal on the second port may be selectively passed to the first antenna port and the second antenna port by activating the second transistor and one of the third transistor and the fourth transistor.

The present invention will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which:

FIG. 21 is a graph illustrating the S-parameter simulation results for the sixth embodiment of the RF switch shown in FIG. 18 in which the 2.4 GHz mode is enabled, the 5 GHz mode is enabled, and a third transistor is on;

FIG. 22 is a graph illustrating the S-parameter simulation results for the sixth embodiment of the RF switch shown in FIG. 18 in which the 2.4 GHz mode is enabled, the 5 GHz mode is disabled, and the third transistor is on;

FIG. 25 is a graph illustrating the S-parameter simulation results for the eighth embodiment of the RF switch shown in FIG. 24 in which the 2.4 GHz mode is enabled, the 5 GHz mode is disabled, and the third transistor is on;

FIG. 30 is a graph illustrating the S-parameter simulation results for the ninth embodiment of the RF switch shown in FIG. 27 in which its first transistor is on, its second transistor is on, and its third transistor is on;

Common reference numerals are used throughout the drawings and the detailed description to indicate the same elements.

DETAILED DESCRIPTION

The present disclosure contemplates various radio frequency (RF) multiport switches of various configurations including single pole-double throw, single pole-triple throw, and double pole-double throw, among others. The switches have high isolation characteristics and high linearity, and may be implemented on a variety of semiconductor processes. The detailed description set forth below in connection with the appended drawings is intended as a description of the embodiments of the RF multiport switches, and is not intended to represent the only forms that may be developed or utilized. The description sets forth the various functions in connection with the illustrated embodiments, but it is to be understood, however, that the same or equivalent functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

Figure 1A:
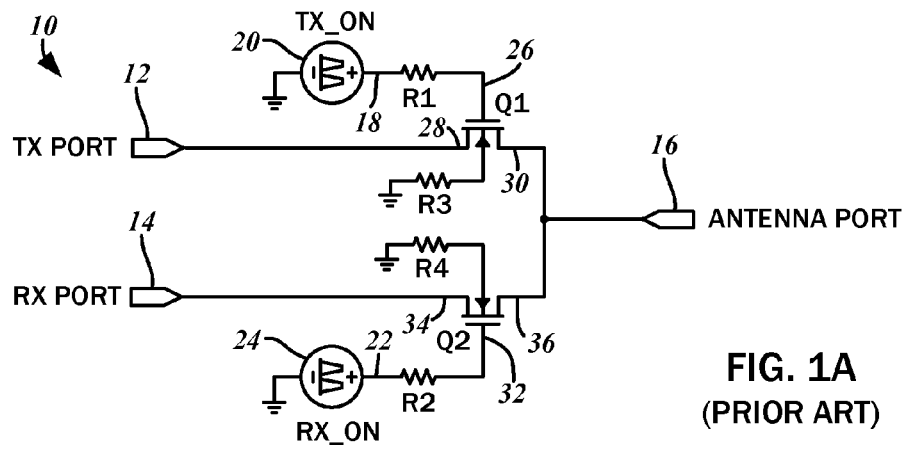
FIGS. 1A, 1B, and 1C are schematic diagrams of conventional RF switches and equivalent circuit representations in various states.

FIG. 1A illustrates a simplified representation of a conventional single pole, single throw RF switch 10 including a transmit port 12, a receive port 14, and an antenna port 16. The transmit port 12 may be connected to an RF transmitter circuit, while the receive port 14 may be connected to an RF receiver circuit. Thus, a single antenna coupled to the antenna port 16 is selectively connected to the RF transmitter and the RF receiver by the RF switch 10. In further detail, the RF switch 10 includes a transmit enable line 18 that is connected to an external transmit enable source 20, as well as a receive enable line 22 that is connected to an external receive enable source 24. The transmit enable source 20 and the receive enable source 24 may or may not be associated with the RF transceiver circuitry. Although various components of the RF switch circuits will be described in terms of transmit and receive functionality, it will be recognized by those having ordinary skill in the art that such references are exemplary only and not limiting. The transmit port 12, for example, may also be referred to more generally as a first port, and receive port 14 may also be referred to more generally as a second port. Along these lines, the transmit enable line 18 may be referred to as a first enable line, and the receive enable line 22 may be referred to as a second enable line.

Generally, a transmit signal on the transmit port 12 is passed to the antenna port 16 and a received signal from the antenna port 16 is passed to the receive port 14 based upon a selective activation of a transistor Q1 and a transistor Q2. For time domain duplexing communications systems, the activation of the transistor Q1 and the transistor Q2 is understood to be exclusive in relation to each other. That is, the transistor Q1 is activated and the transistor Q2 is deactivated in a transmit mode, while the transistor Q1 is deactivated and the transistor Q2 is activated in a receive mode. The transistor Q1 includes a gate node 26 that is connected to the transmit enable line 18, a source node 28 that is connected to the transmit port 12, and a drain node 30 that is connected to the antenna port 16. Similarly, the transistor Q2 includes a gate node 32 connected to the received enable line 22, a source node 34 that is connected to the receive port 14, and a drain node 36 that is connected to the antenna port 16. The transistors Q1 and Q2 are understood to have a resistive substrate loss represented by R3 and R4, which is understood to be dependent on the particular semiconductor process utilized in its manufacture.

With the transmit enable source 20 being on, the voltage level applied to the gate node 26 through the resistor R1 is above the threshold level, that is, for example, greater than 0.5 V. As a consequence, there is a low impedance between the drain node 30 and the source node 28, allowing the transmit signal on the transmit port 12 to be passed to the antenna port 16 with minimal loss. The resistor R1 is understood to have fairly large values, for example, greater than 10 K-Ohm. When the transmit enable source 20 is off, the voltage level at the gate node 26 is below the threshold (e.g., less than 0.5 V). In this case, there is a high impedance between the drain node 30 and the source node 28, although there is some level of leakage through the transistor Q1 if there is a received signal on the antenna port 16.

The transistor Q2 is understood to have the same functional characteristics with the received enable source 24 being on. The voltage level applied to the gate node 32 through the resistor R2 is above the threshold level (e.g., greater than 0.5 V). The resistor R2 is understood to have fairly large values, for example, greater than 10 K-Ohm. There is a low impedance between the drain node 36 and the source node 34, and the received signal on the antenna port 16 is passed to the receive port 14 with minimal loss. Likewise, with the received enable source 24 being off, the voltage level at the gate node 32 is below the threshold and there is a high impedance between the drain node 36 and the source node 34. As indicated above in relation to the transistor Q1, there is some leakage of a transmit signal on the antenna port 16 through the transistor Q2 and back to the receive port 14.

Figure 1B:
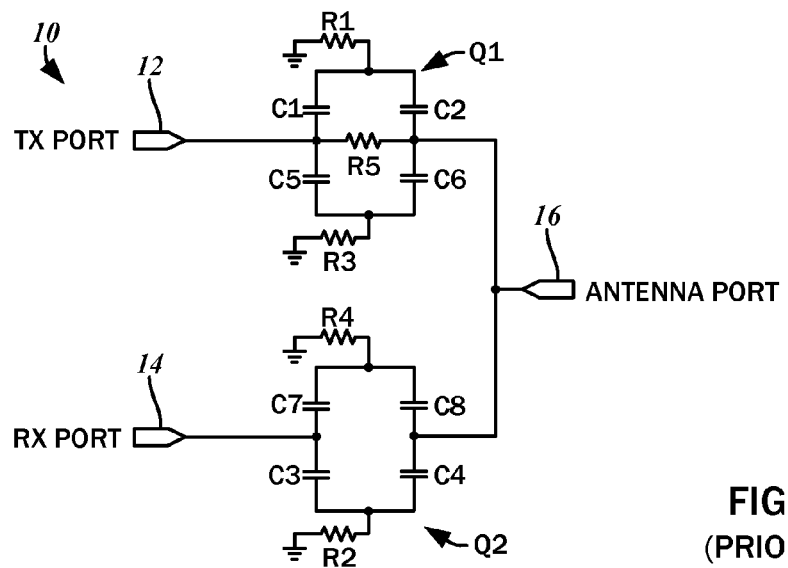

The conventional RF switch 10 described above has several additional capacitive components that are shown in the equivalent circuit of FIG. 1B. These components are understood to exert an influence over the transmitted and received signals depending on the state of the transistors Q1 and Q2. When the transistor Q1 is activated, the resistance R5 between the drain node 30 and the source node 28 has a relatively low value (e.g., less than 5 Ohm). The deactivated transistor Q2 has a resistance between the drain node 36 and the source node 34 that may be substantially greater than 50 Ohm. The reverse is true when the transistor Q2 is activated while the transistor Q1 is deactivated. The capacitance between the gate node 26 and the source node 28 as well as the drain node 30 of transistor Q1 is represented by capacitors C1 and C2, and the capacitance between the gate node 32 and the source node 34 as well as the drain node 36 of the transistor Q2 is represented by capacitors C3 and C4. For the transistor Q1, the capacitance between the substrate and the source node 28 is represented by capacitor C5, and the capacitance between the substrate and the drain node 30 is represented by capacitors C6. Similarly, for the transistor Q2, the capacitance between the substrate and the source node 34 is represented by capacitor C7, and the capacitance between the substrate and the drain node 36 is represented by capacitor C8.

Figure 1C:
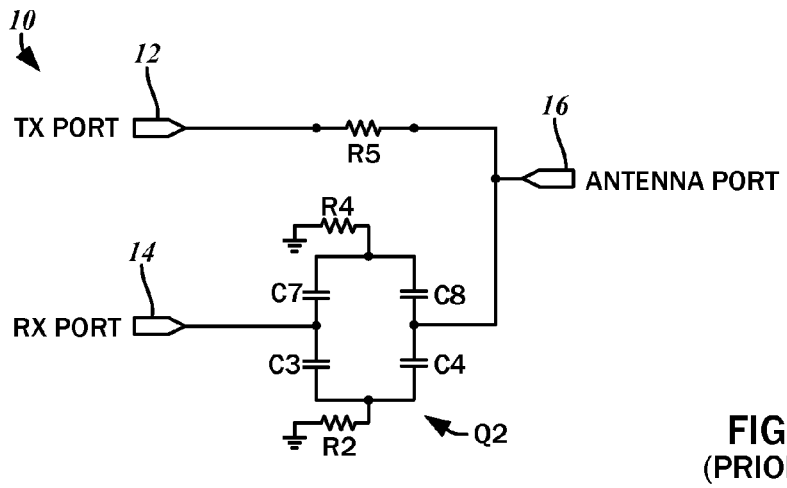

With reference to the schematic diagram of FIG. 1C, the conventional RF switch 10 in the transmit mode, that is, the transistor Q1 is activated and the transistor Q2 is deactivated, can be further simplified. In particular, the resistors R1, R3, as well as capacitors C1, C2, C5, and C6 can be disregarded and hence eliminated from the simplified equivalent circuit. Again, as mentioned above, the resistor R5 represents the channel resistance in transistor Q1 in the on state. The resistor R5 is understood to effect a signal loss when a transmit signal is passed from the transmit port 12 to the antenna port 16. The impedance between the antenna port 16 and the receive port 14 is understood to be substantially higher than 50 Ohm, i.e., the characteristic output impedance of the antenna port 16, so its influence on the transmit signal being passed to the antenna port 16 is understood to be minimal. The transistor Q2 can similarly be simplified to a single resistor when in an activated state.

Leakage of the transmit signal to the receive port 14, however, depends on the equivalent circuit comprised of the resistors R2 and R4, as well as the capacitors C3, C4, C7, and C8. The geometry or size of the transistor Q2 defines the degree of signal loss when it is activated, and the degree of leakage when it is deactivated. The resistor R2 is an external component, so the value of which may be set or varied during design. The substrate resistance R4 is dependent upon the particular semiconductor process. For transistors Q1 and Q2 that are produced by the GaAs (Gallium Arsenide) and SOI (Silicon-On Insulator) processes, the substrate resistance R4 is substantially high, and so leakage can be minimized to a certain extent. With conventional CMOS (Complementary Metal-Oxide Semiconductor) processes, the substrate resistance R4 is relatively low, and so leakage between the transmit port 12 and the receive port 14 is relatively high, meaning that the isolation between the transmit port 12 and the receive port 14 is low. Although not illustrated in FIG. 1C, the transistor Q1 can be represented by the simplified equivalent circuit described above in relation to transistor Q2 when it is deactivated. It will be recognized that for any semiconductor process, insertion loss and leakage are dependent upon frequency. As a general rule, the higher the frequency, the higher the loss and leakage.

Figure 2:
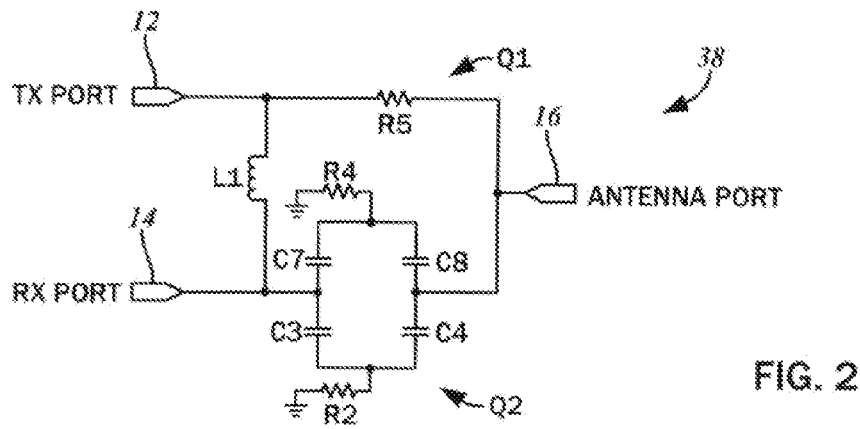
FIG. 2 is a schematic diagram of an equivalent circuit of an RF switch with a single pole, double throw configuration in accordance with a first embodiment of the present disclosure.

With reference to the schematic diagram of FIG. 2, a first embodiment of an RF switch circuit 38 will now be described. As in the conventional RF switch 10, there is the first or transmit port 12, a second or receive port 14 and an antenna port 16. Likewise, the RF switch circuit 38 includes the first transistor Q1 that is connected to the transmit port 12, the antenna port 16, and the first or transmit enable line 18. The first transistor Q1 is understood to be selectively activatable in response to a transmit enable signal applied to the transmit enable line 18. The second transistor Q2 is connected to the second or receive port 14, the antenna port 16, and the second or receive enable line 22. The second transistor Q2 is selectively activatable in response to a received signal applied to the receive enable line 22. For the sake of simplicity, FIG. 2 presents the case when the first transistor Q1 is activated and the second transistor Q2 is deactivated. In accordance with one embodiment of the present disclosure, the first transistor Q1 and the second transistor Q2 are understood to have a negative channel field effect structure (NFET). However, it will be recognized that any other semiconductor structure may be substituted without departing from the scope of the present disclosure. Alternative semiconductor structures include CMOS (Complementary Metal-Oxide Semiconductor), GaAs MESFET (Gallium Arsenide metal semiconductor field effect transistor), HEMT (high electron mobility transistor), SOI (silicon-on-insulator), positive channel field effect (PFET) and so forth.

With the second transistor Q2 deactivated, there is a capacitive influence upon the transmit signal leaked to the receive port 14. In particular, the phase and amplitude of the leakage signal is shifted from that of the transmit signal applied to the transmit port 12. In accordance with various embodiments of the present disclosure, the RF switch circuit 38 includes a first inductor L1, which is understood to compensate for parasitic capacitance between the transmit port 12 and the receive port 14 from the inactive one of the first and second transistors Q1 and Q2. The compensation inductor L1 phase shifts a first or transmit signal on the transmit port 12, which is then applied to the receive port 14. This shifted signal on the compensation inductor L1 may have an amplitude that is substantially the same as that of the leakage signal from the deactivated second transistor Q2, but with an opposite phase. Thus, the overall signal amplitude at the receive port 14 may be minimized, and a high level of isolation between the transmit port 12 and the receive port 14 may be realized.

Considering that the first transistor Q1, when activated, has a low resistance value, (e.g., less than 5 Ohm), the transmit port 12 and the antenna port 16 may be deemed as essentially shorted. The deactivated second transistor Q2 is represented by the relatively large resistors R2 and R4, along with a capacitive impedance including C3, C4, C7, and C8. The equivalent capacitance of the second transistor Q2 may be represented as C3*C4/(C3+C4)+C7*C8/(C7+C8). The compensation inductor L1 is thus tuned with the equivalent capacitance to generate a parallel resonance at a first operating frequency, and isolates the transmit port 12 and the receive port 14. It will be recognized that when the first transistor Q1 is deactivated and the second transistor Q2 is activated, the foregoing equivalent circuit representations reciprocally apply thereto.

Figure 3:
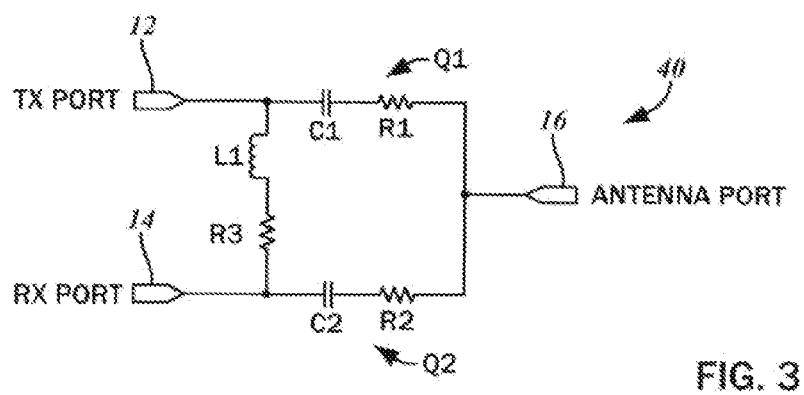
FIG. 3 is a schematic diagram of a simplified equivalent circuit of the RF switch shown in FIG. 2.

FIG. 3 shows a simplified equivalent circuit 40 of the first embodiment of the RF switch circuit 38. In this representation, the first transistor Q1 corresponds to a series chain of the resistor R1 with capacitor C1, and the second transistor Q2 corresponds to a series chain of the resistor R2 and the capacitor C2. The resistor R3 is understood to represent a series loss associated with the compensation inductor L1. With the first transistor Q1 turned on, the equivalent resistor R1 has a low value (e.g., less than 5 Ohm), and the equivalent capacitor C1 has a relatively high value (e.g., greater than 50 pF). With the transistor Q2 turned off, the equivalent resistor R2 has a high value (e.g., greater than 15 Ohm), and the equivalent capacitor C2 has a low value, (e.g., less than 0.2 pF). In simplified form, the value of the compensation inductor L1 is set to resonate with the capacitance C2. A relatively high value of the series loss resistance R3 may be selected for a simplified on semiconductor implementation with a low Q-factor and a small footprint. Again, with the first transistor Q1 deactivated and the second transistor Q2 activated instead, similar equivalent circuits of the deactivated second transistor Q2 and the activated first transistor Q1, respectively, may be applicable.

Figure 4:
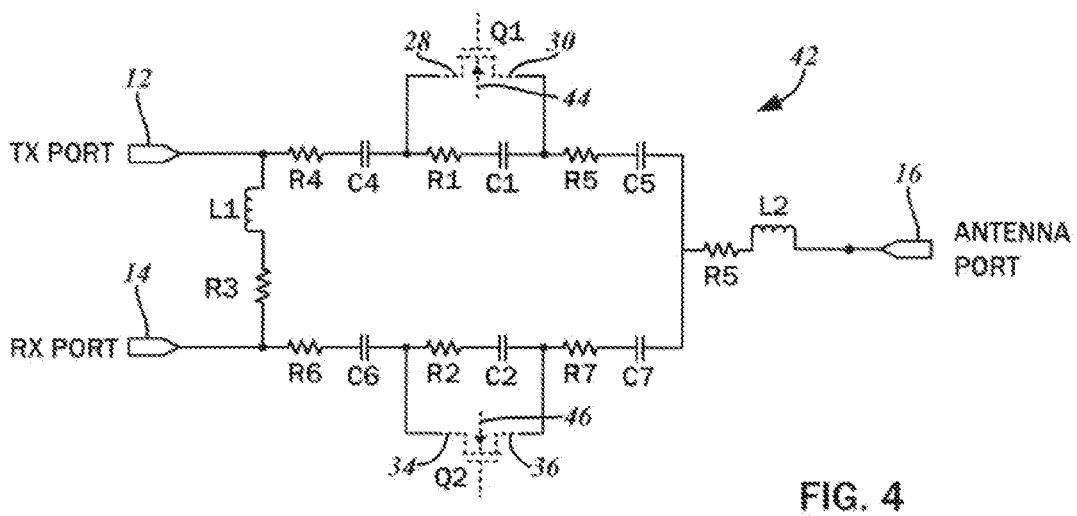
FIG. 4 is a schematic diagram of the first embodiment of the RF switch.

The schematic diagram of FIG. 4 illustrates one implementation 42 of the first embodiment of the RF switch circuit 38. For the first transistor Q1 and the second transistor Q2 to perform in the manner described above, voltage sources are applied to bias the respective sources 28, 34 and drains 30, 36 thereof. The voltage sources are not shown for the sake of simplicity. The voltage source for the source node 28 of the first transistor Q1 is separated from the transmit port 12 with a capacitor C4, and the voltage source for the source node 34 of the second transistor Q2 is separated from the receive port 14 with a capacitor C6. In one contemplated embodiment, the capacitors C4 and C6 are understood to have a capacitance value of 4 pF. Furthermore, in order to separate the voltage source for the drain node 30 of the first transistor Q1 from the antenna port 16, the RF switch circuit 38 includes a capacitor C5. Similarly, in order to separate the voltage source for the drain node 36 of the transistor Q2 from the antenna port 16, there is a capacitor C7. In the one embodiment, the capacitors C5 and C7 likewise have a capacitance value of 4 pF. There are resistive losses associated with the each of the capacitors C4, C5, C6, and C7 noted as resistors R4, R5, R6, and R7, respectively, which each may have a resistance value of 0.18 Ohm. The compensation inductor L1 is understood to have an inductance of 5 nH and the associated resistive loss R3 of 12 Ohm. This implementation contemplates the fabrication of the various components of the RF switch circuit 38 on a single semiconductor die, and the inductor L2 of 0.75 nH and the associated resistive loss R8 of 0.144 Ohm are understood to be associated with the wire bond from the die pad to the package lead.

Having described the basic components of the first embodiment of the RF switch circuit 38, the functional details thereof will now be considered. As with the conventional RF switch 10, there is a transmit mode in which the first transistor Q1 is activated, and the signal on the transmit port 12 is passed to the antenna port 16. In further detail, a positive voltage (for a NMOS transistor) is applied to the gate node 26 of the first transistor Q1, which activates the same and provides a low impedance path between the source node 28 and the drain node 30.

The second transistor Q2, on the other hand, is turned off during the transmit mode. There is little to no voltage applied to the gate node 32 of the second transistor Q2, which is biased off with a high voltage applied to the source node 34 and the drain node 36 thereof. Regardless of the high-voltage transmit signal on the antenna port 16, the second transistor Q2 remains off. According to one embodiment, body or substrate terminals 44, 46 of the first and second transistors Q1, Q2, respectively are tied to ground, or at least the lowest potential of the circuit. Additionally, the body terminals 44, 46 may be tied to the sources 28, 34. The parasitic capacitance associated with the deactivated second transistor Q2 is understood to be tuned out by the compensation inductor L1, which, as mentioned above, improves the isolation between the transmit port 12 and the receive port 14.

The functionality of the first transistor Q1 and the second transistor Q2 in the transmit mode is reversed in the receive mode. The first transistor Q1 is deactivated, while the second transistor Q2 is activated in the receive mode. The features described above in relation to an activated transistor is understood to be applicable to the second transistor Q2, while the features described in relation to the deactivated transistor is understood to be applicable to the first transistor Q1.

The capacitors C4 and C5, which are connected to the source node 28 and the drain node 30, respectively of the first transistor Q1 are understood to be direct current (DC) blocks for its proper biasing. Specifically, substantially high resistances (e.g., greater than 50 Ohm) bias the gate node 26, source node 28, and the drain node 30, and block RF signal leaks therethrough. The capacitors C4 and C5 are selected with values to minimize insertion loss, and counteract the inductive impedance of inductor L2. Along these lines, the capacitors C6 and C7, which are connected to the source node 34 and the drain node 36, respectively, of the second transistor Q2 are likewise understood to be direct current (DC) blocks for the proper biasing.

Figure 5:
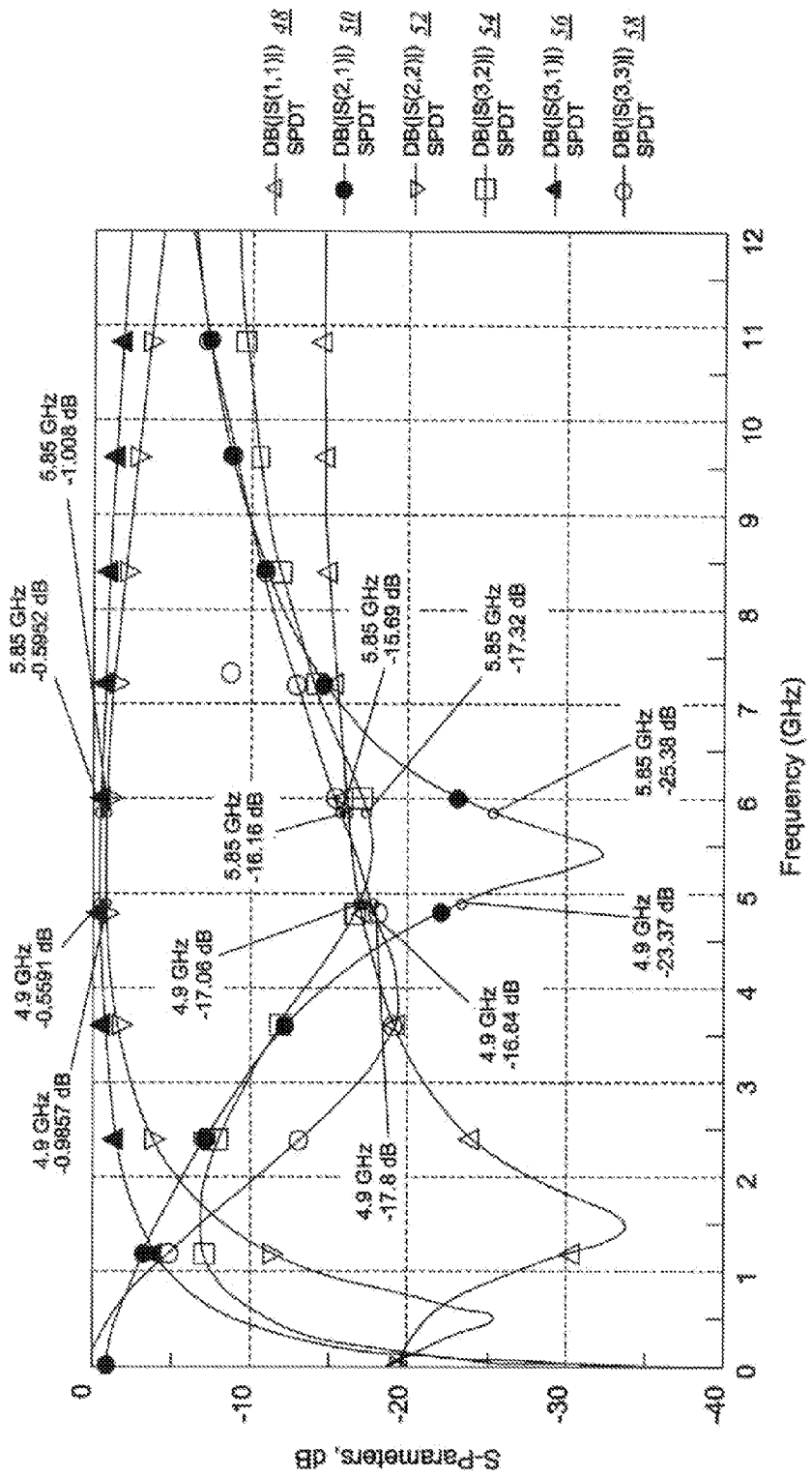
FIG. 5 is a graph illustrating the S-parameter simulation results for the first embodiment of the RF switch.

A simulated performance of the first implementation 42 of the RF switch circuit in terms of scattering parameters (S-parameters) is shown in the graph of FIG. 5. There is a plot of a first port reflection coefficient 48 (S11), the first port to second port gain 50 (S21), a second port reflection coefficient 52 (S22), an antenna port to second port forward gain 54 (S32), an antenna port to first port reverse gain 56 (S31), and an antenna port reflection coefficient 58 (S33). As illustrated, the isolation between the transmit port 12 and the receive port 14 (S21) is slightly less than −23 dB in the frequency band segmented for I.E.E.E. 802.11a wireless LAN (WLAN) spanning from 4.9 to 5.85 GHz. The first implementation 42 of the RF switch circuit also exhibits a very low insertion loss of 0.55 to 0.59 dB in this operating frequency band. Additionally, the active ports, i.e., the transmit port 12 and antenna port 16 have good matching characteristics, with S11 and S33 both being below −16 dB. Although the isolation between the antenna port 16 and the receive port 14 (S31) is less than −16 dB, it will be appreciated that only when the antenna voltage standing wave ratio is high, and the reflected antenna signal has a low value that is leaking to the receive port 14 and is attenuated above −16 dB, would there be any potential issues.

Figure 6:
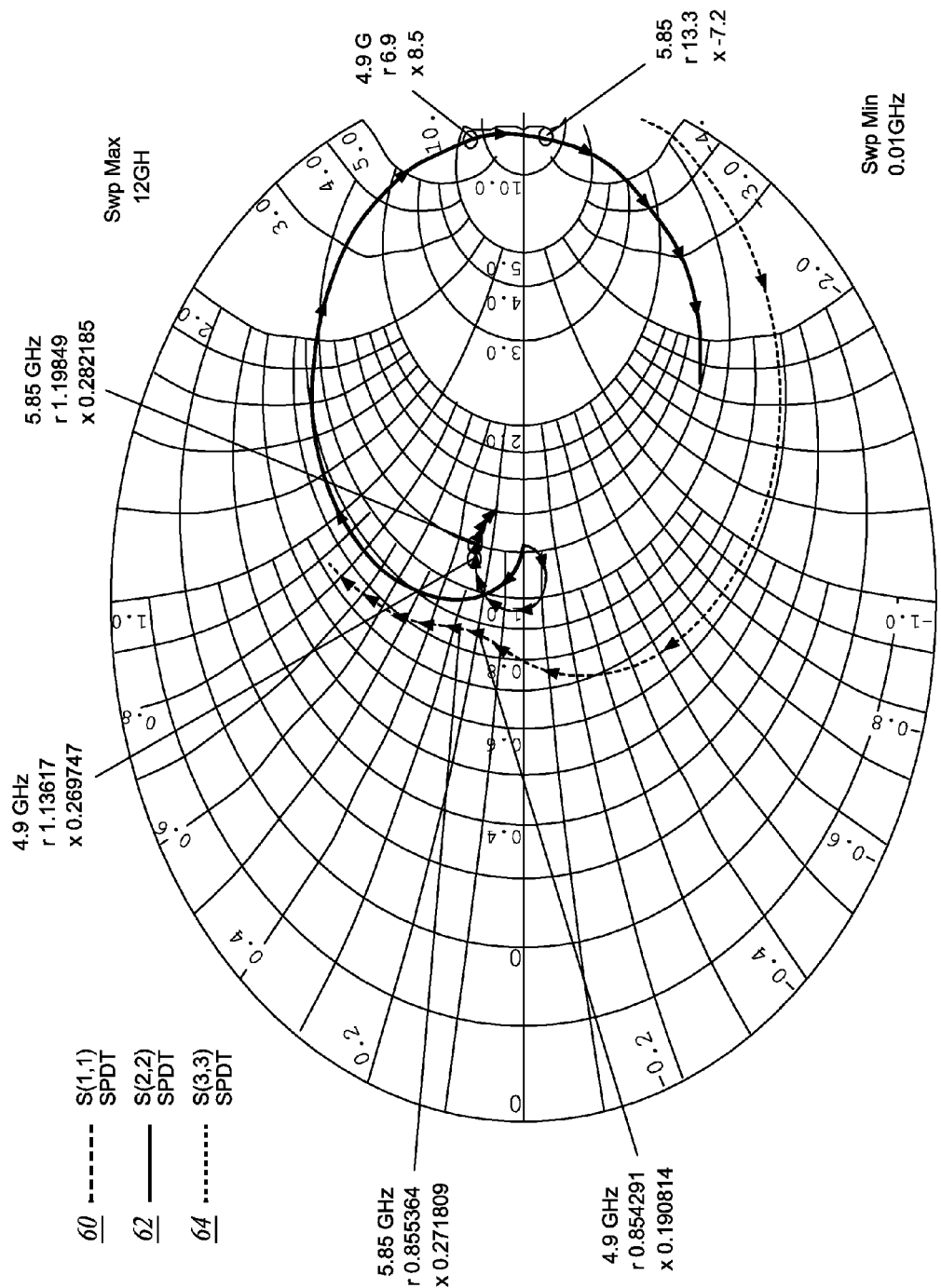
FIG. 6 is a Smith chart showing the return loss of the first embodiment of the RF switch.

The Smith chart of FIG. 6 depicts the return loss at each port when the first transistor Q1 is on and the second transistor Q2 is off, and includes a first plot 60 of S11, a second plot 62 of S22, and a third plot 64 of S33. The impedance at the inactive port, i.e., the receive port 14, is not matched to 50 Ohm, rather, it is greater than 50 Ohm. This, however, is not detrimental to the performance of the RF switch circuit 42 since the receive port 14 is inactive. Furthermore, the high impedance value at the receive port 14 is one of the reasons the overall insertion loss is only about 0.5 dB despite the compensation inductor L1 having a low Q-factor and an equivalent series resistance of around 12 Ohm. The return loss at each port with the transistor Q1 off and the second transistor Q2 on is expected to be substantially the same.

Figure 7:
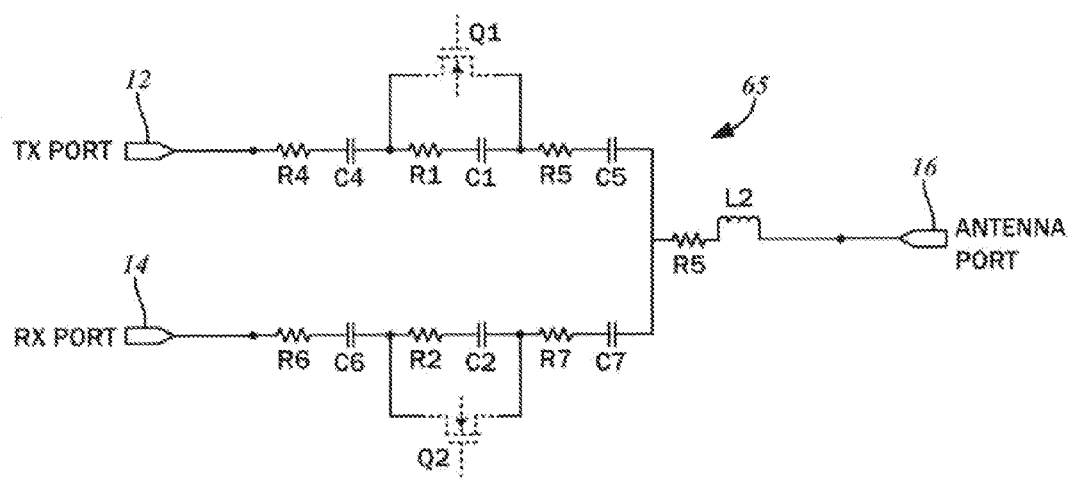
FIG. 7 is a schematic diagram of a conventional RF switch without a compensation inductor.

By way of comparison, the performance of a conventional RF switch 10 without the aforementioned compensation inductor L1 has also been simulated. FIG. 7 illustrates a switch circuit 65, with the capacitors C4, C5, C6, and C7, as well as resistors R4, R5, R6, and R7 being included for the same purposes described above in relation to the RF switch circuit 42. Again, the inductor L2 and the parasitic resistor R8 are included and correspond to the wire bond from the die pad to the package lead.

Figure 8:
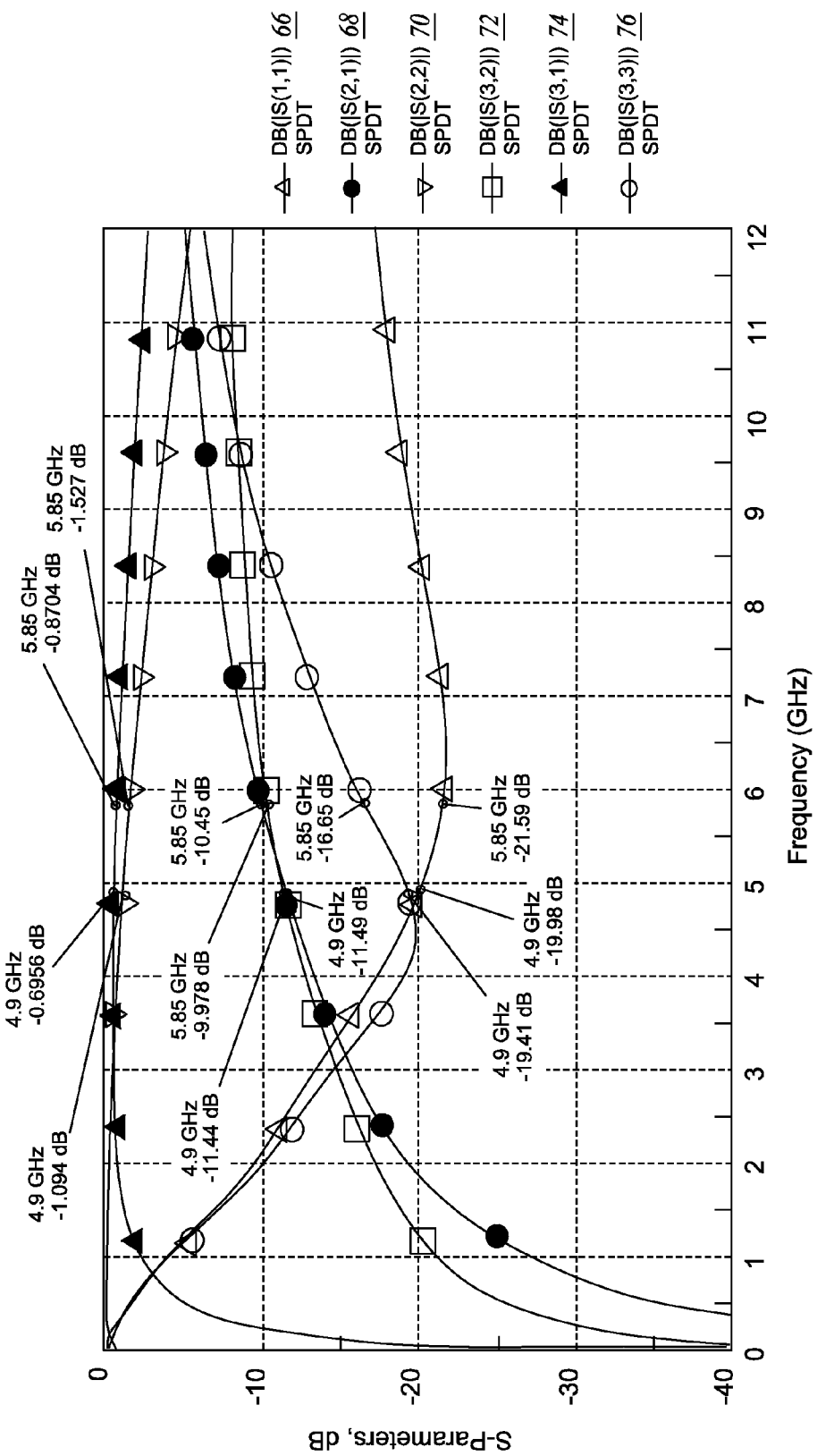
FIG. 8 is a graph illustrating the S-parameter simulation results for the conventional RF switch shown in FIG. 7.

The graph of FIG. 8 showing the S-parameters likewise includes a plot of a first port reflection coefficient 66 (S11), the first port to second port gain 68 (S21), a second port reflection coefficient 70 (S22), an antenna port to second port forward gain 72 (S32), an antenna port to first port reverse gain 74 (S31), and an antenna port reflection coefficient 76 (S33). As shown, the isolation between the transmit port 12 and the receive port 14 (S21) in the WLAN frequency band of 4.9 to 5.85 GHz is only slightly less than −10 dB. It is noted that with the compensation inductor L1 in the RF switch circuit 42, this performance metric was −23 dB. A substantial portion of the leakage is attributable to the semiconductor substrate resistance, which is the resistor R2 along with the capacitance C2 shown in the schematic diagram of FIG. 7.

Figure 9:
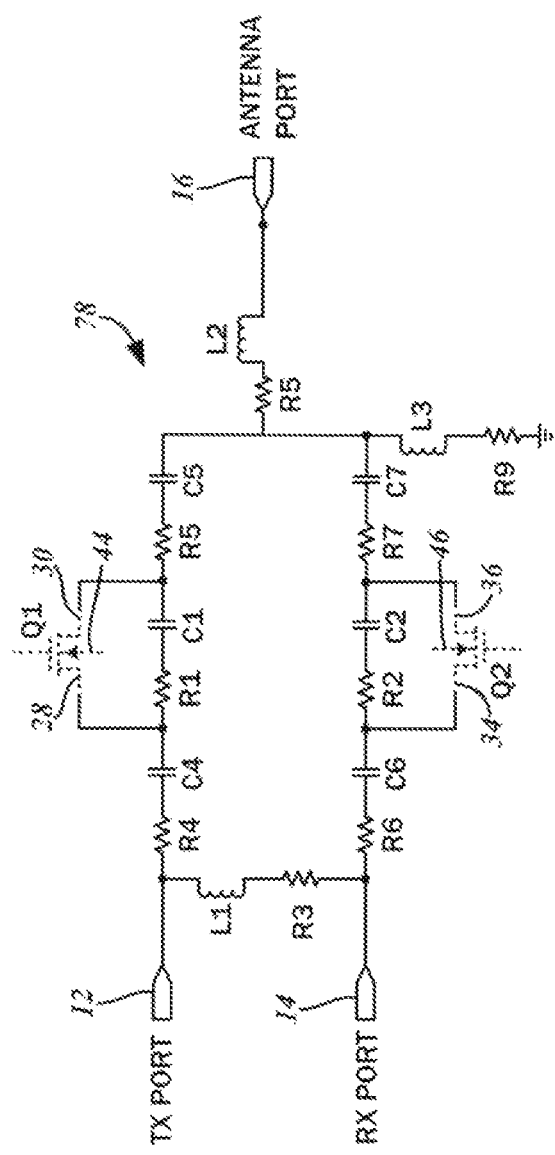
FIG. 9 is a schematic diagram of a second embodiment of the RF switch circuit including an electro-static discharge inductor connected to the antenna port.

The schematic diagram of FIG. 9 illustrates a second embodiment of the RF switch circuit 78, which is understood to be the same as the first embodiment 42 described previously and having the same component values, except as noted below. Specifically, at the junction between the transmit chain and the receive chain before the antenna port 16, that is, at the capacitors C5 and C7, a first electrostatic discharge inductor L3 is connected. It is expressly contemplated that the transmit port 12 and the receive port 14 are part of the transceiver circuitry and implemented on the same die, so electrostatic discharge protection circuitry is not included.

The various components of the RF switch circuit 78 are fabricated on a single semiconductor die, and the inductor L2 and associated resistive loss R5 are associated with the wire bond from the die pad to the package lead. In actual implementation, the electrostatic discharge inductor L3 is connected to the die paddle, and is understood to protect the integrated circuit from an ESD pulse from the antenna port 16. The complex impedance of the inductor L3 is understood to be substantially larger than the characteristic 50 Ohm impedance of the antenna port 16 at the contemplated operating frequency range. Accordingly, it is understood not to alter the performance of the RF switch circuit 78 in either the receive or the transmit mode. Besides its use for electrostatic discharge protection, the inductor L3 may also be utilized as a tuning element.

In terms of general functionality, the second embodiment of the RF switch circuit 78 is otherwise substantially the same as that of the first embodiment 42. Such similarity includes the activation and deactivation of the first and second transistors Q1, Q2 and attendant parasitic capacitances of such components in different states, as well as the features of the compensation inductor L1, DC blocking capacitors, and so forth. Because the details thereof have been discussed above, they will not be repeated here.

Figure 10:
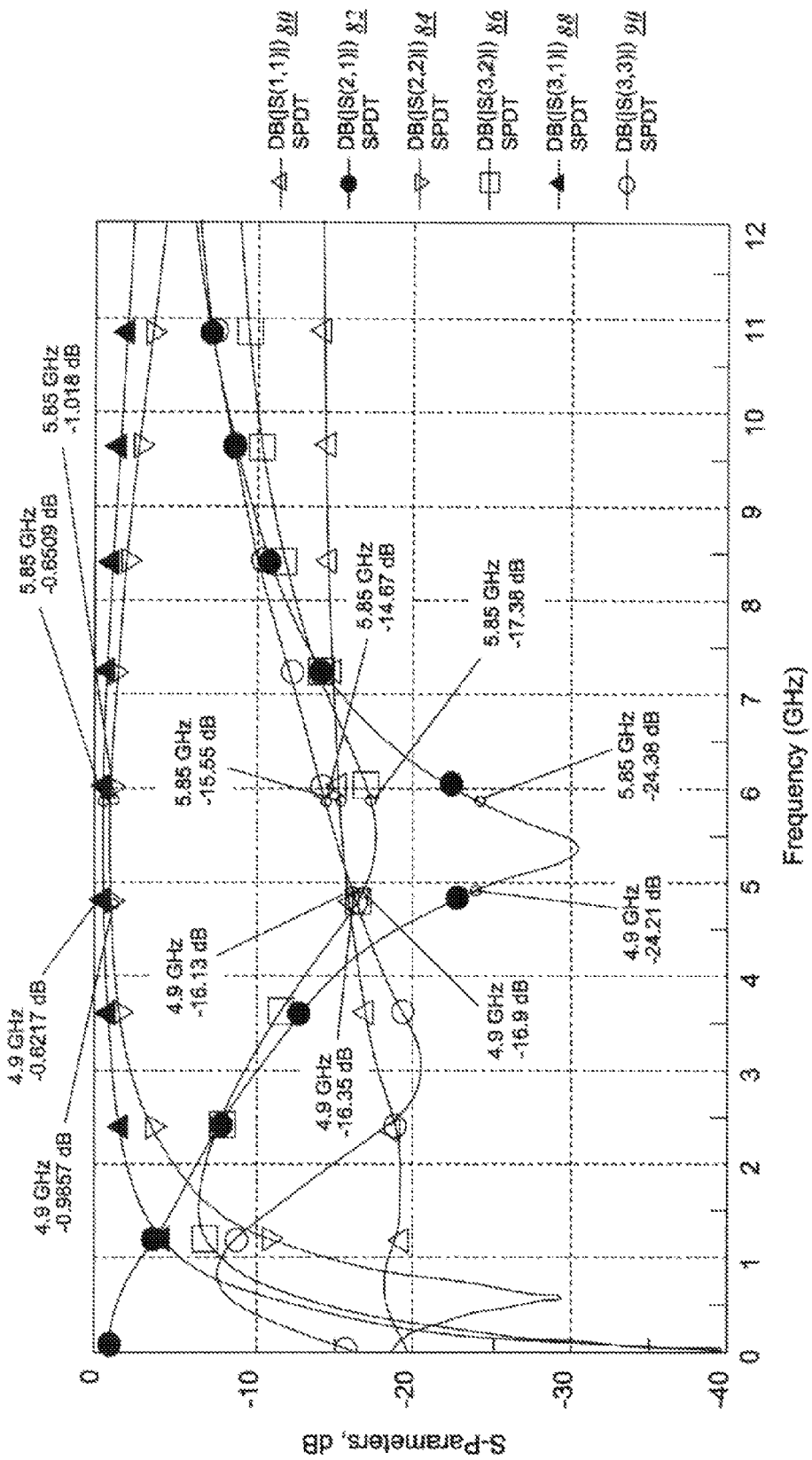
FIG. 10 is a graph illustrating the S-parameter simulation results for the second embodiment of the RF switch shown in FIG. 9.

The graph of FIG. 10 shows the S-parameters from the simulation of the RF switch circuit 78 and includes a plot of a first input reflection coefficient 80 (S11), the first input to second port gain 82 (S21), a second port reflection coefficient 84 (S22), an antenna port to second port forward gain 86 (S32), an antenna port to first port reverse gain 88 (S31), and an antenna port reflection coefficient 90 (S33). In comparison to the first embodiment of the RF switch circuit 42 that does not include the electrostatic discharge inductor L3, the insertion loss is increased by a little less than 0.1 dB, while isolation and return loss performance is substantially the same.

Figure 11:
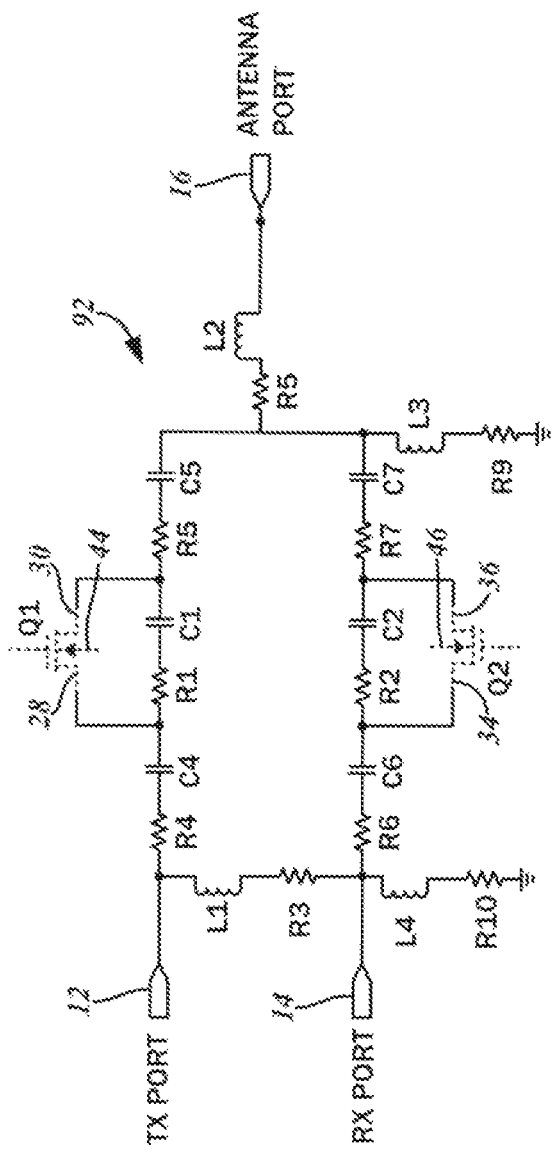
FIG. 11 is a schematic diagram of a third embodiment of the RF switch circuit including electro-static discharge inductors connected to the antenna port and the first or second ports.

With reference to the schematic diagram of FIG. 11, a third embodiment of the RF switch circuit 92 includes another, second electrostatic discharge inductor L4 that is connected in series with the compensation inductor L1. This third embodiment 92 is identical to the second embodiment 78 discussed above, except for the addition of the second electrostatic discharge inductor L4. While in the second embodiment 78, the transmit port 12 and the receive port 14 were part of the transceiver circuitry and implemented on the same die, in the third embodiment 92, the switch circuit is understood to be a standalone component independent and separate from the transceiver.

The second electrostatic discharge inductor L4 is connected to the receive port 14, but it is also contemplated that it may be connected to the transmit port 12. Regardless of its connection location the second electrostatic discharge inductor L4 provides electrostatic discharge protection for both the transmit port 12 and the receive port 14. The electrostatic discharge flows through the inductor L4 to the common node, which may be the die paddle and to the antenna through the inductor L3 if it is introduced anywhere between the transmit port 12 or the receive port 14 and the antenna port 16. If, on the other hand, the electrostatic discharge pulse is introduced between the transmit port 12 and the receive port 14, it is understood to flow through the compensation inductor L1 along with the ESD inductor L4 to ground.

The antenna port 16 continues to remains separate from the switch circuit, hence the inclusion of the first electrostatic discharge inductor L3. This is connected to the die paddle, and may protect the switch integrated circuit from an ESD pulse from the antenna port 16. The complex impedance of the inductor L3 is understood to be substantially larger than the characteristic 50 Ohm impedance of the antenna port 16 at the contemplated operating frequency range, so the performance of the RF switch circuit 92 is altered little, if at all, in either the receive or the transmit mode. Along these lines, the complex impedance of the inductor L4 is likewise substantially larger than the characteristic impedance of the transmit port 12 and the receive port 14. Thus, the inductor L4 has very little effect on the performance of the RF switch circuit 92. Besides its use for electrostatic discharge protection, the inductor L4 may also be utilized as a tuning element.

Again, with regard to general functionality, the third embodiment of the RF switch circuit 92 is otherwise substantially the same as that of the first embodiment 42 discussed above. This similarity in features encompasses the activation and deactivation of the first and second transistors Q1, Q2 and attendant parasitic capacitances of such components in different states, as well as the features of the compensation inductor L1, DC blocking capacitors, and so forth, the details thereof having been discussed above.

Figure 12:
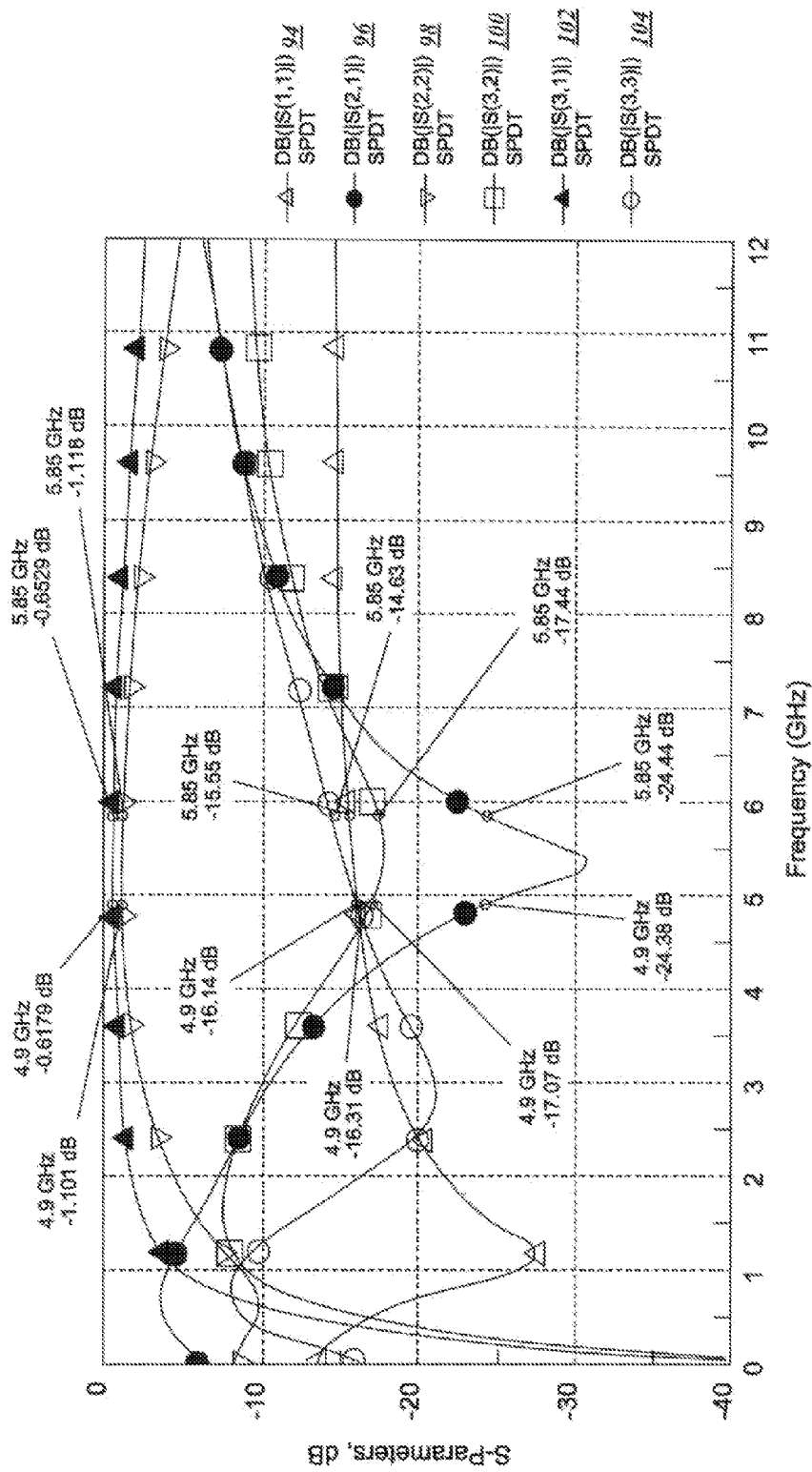
FIG. 12 is a graph illustrating the S-parameter simulation results for the third embodiment of the RF switch shown in FIG. 11.

The graph of FIG. 12 shows the S-parameters from the simulation of the RF switch circuit 92 and includes a plot of a first port reflection coefficient 94 (S11), the first port to second port gain 96 (S21), a second port reflection coefficient 98 (S22), an antenna port to second port forward gain 100 (S32), an antenna port to first port reverse gain 102 (S31), and an antenna port reflection coefficient 104 (S33). In comparison to the second embodiment of the RF switch circuit 78 that only includes the first electrostatic discharge inductor L3, with the inclusion of the second electrostatic discharge inductor L4, the insertion loss is increased by a little less than 0.1 dB, while isolation and return loss performance is substantially the same.

Figure 13:
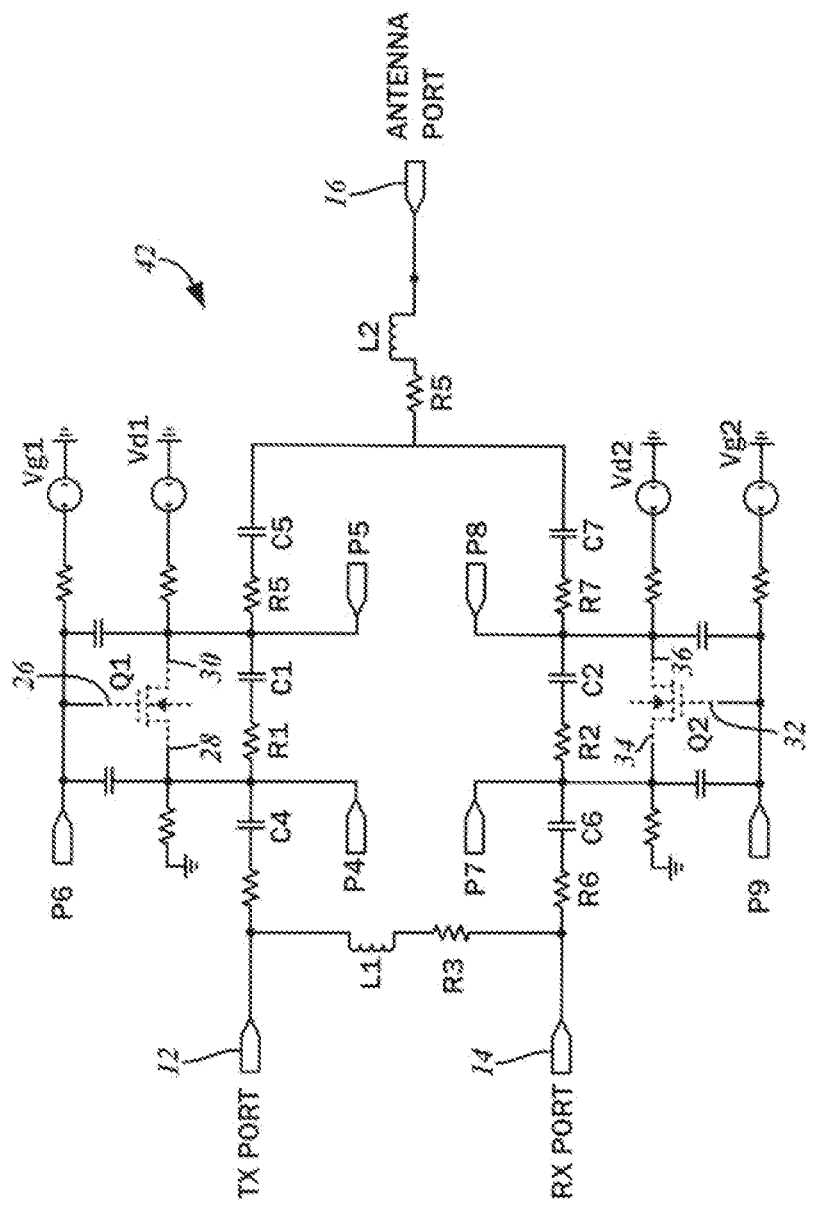
FIG. 13 is a schematic diagram of the first embodiment of the RF switch circuit showing the transistor biasing sources and select ports placed throughout the circuit for voltage measurements.
Figure 14:
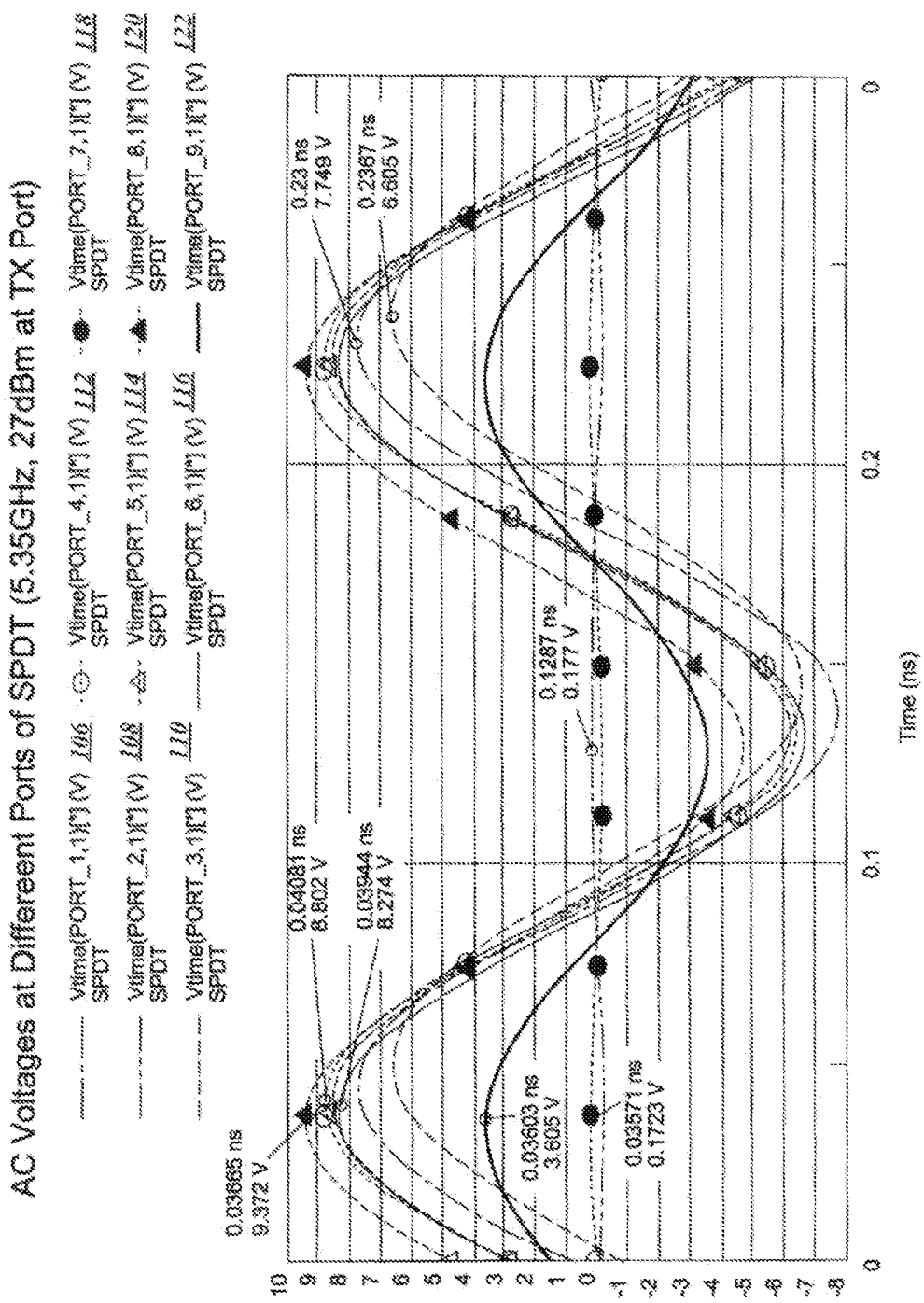
FIG. 14 is a graph illustrating simulated AC voltages at the select ports shown in the schematic diagram of the RF switch circuit of FIG. 13.

The schematic diagram of FIG. 13 shows a further detailed view of the first embodiment of the RF switch circuit 42. In this depiction, the biasing voltage sources Vg1 and Vg2 for the gates 26, 32 and Vd1 and Vd2 for the drains 30, 36 of the first and second transistors Q1, Q2, respectively, are shown. Furthermore, there are high impedance measurement ports P4, P5, P6, P7, P8 and P9 that have been inserted, the readings from which are shown in the graph of FIG. 14 as various plots. The impedances of these ports are understood to be around 100K Ohm. These include a plot 106 of simulated measurements taken from the transmit port 12, a plot 108 of simulated measurements taken from the receive port 14, and a plot 110 of simulated measurements taken from the antenna port 16. There are several plots for simulated measurements from the first transistor Q1 including a plot 112 of the source node 28, a plot 114 of the drain node 30, and a plot 116 of the gate node 26. Additionally, there are several plots for simulated measurements from the second transistor Q2 including a plot 118 of the source node 34, a plot 120 of the drain node 36, and a plot 122 of the gate node 32.

With reference to the graph of FIG. 14, based upon an example large signal level of 27 dBm at 5.35 GHz, the differential voltage between the gate node 32 and the drain node 36, as well as between the gate node 32 and the source node 34, of the deactivated second transistor Q2 can reach high levels and degrade the reliability of the RF switch circuit 42. For example, the gate-source voltage of the transistor Q2 is given by subtracting the peak voltage of the plot 118 from the peak voltage of the plot 122: 3.605V−0.1723V, which is 3.4327V it is possible that this voltage level may be sustained by and 3.3V n-channel field effect transistor (NFET). However, the gate-drain voltage of the second transistor Q2, given by subtracting the peak voltage of the plot 122 from the peak voltage of the plot 120, is 9.372V−3.605V, or 5.76V. At this voltage level, the reliability of the 3.3V NFET will be degraded, and may even result in a hard breakdown of the dielectric layer between the gate node 32 and the drain node 36. One contemplated solution is the use of a NFET with a higher breakdown voltage around 5V or above, for example. As will be recognized by those having ordinary skill in the art, such a transistor has an increased die area with attendant degradation in high frequency performance. Alternatively, the minimization of differential AC voltage swings between the gate node 32 and the source node 34, as well as the gate node 32 and the drain node 36, is also contemplated in accordance with various embodiments of the present disclosure.

Figure 15:
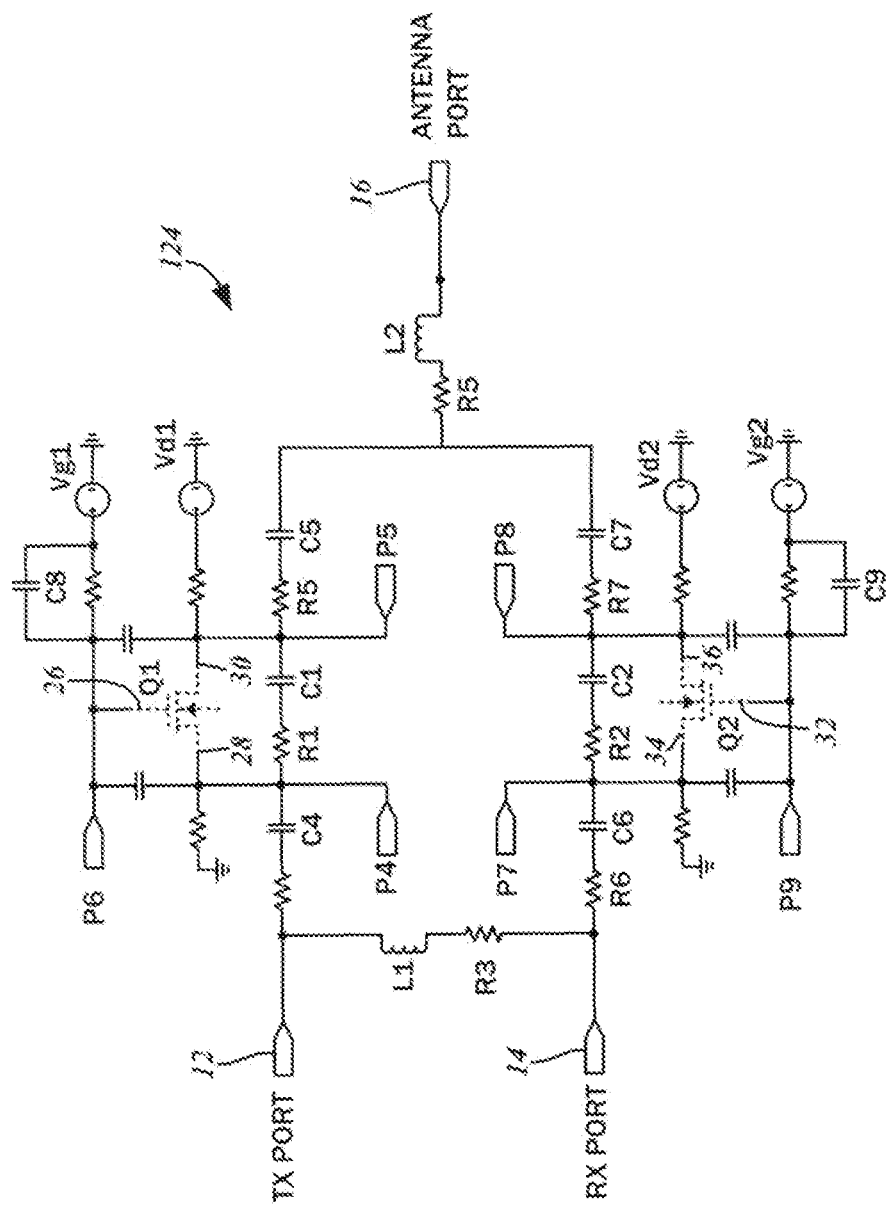
FIG. 15 is a schematic diagram of a fourth embodiment of the RF switch circuit including shunt capacitors at the gates of the transistors.

Referring now to the schematic diagram of FIG. 15, a fourth embodiment of the RF switch circuit 124 includes shunt capacitors C8, C9 connected to the gates 26, 32 and the biasing sources Vg1, Vg2 of the respective first and second transistors Q1, Q2. The values of the shunt capacitors C8, C9 may be 0.1 pF, and are understood to reduce voltage swing between the terminals of the first and second transistors Q1, Q2 for improved reliability and linearity. More particularly, the shunt capacitor C9 reduces the voltage across the gate node 32 and the source node 34 of the second transistor Q2, which is contemplated to be off during the transmit mode and when the voltage level at the antenna is high. In other words, the shunt capacitor C9 prevents the second transistor Q2 from being turned on when it is intended to be off, as set by the receive enable line 22. Accordingly, linearity is improved, with a higher 1 dB compression point and lower inter-modulation distortion. The shunt capacitor C8 is understood to have the same performance features but in relation to the first transistor Q1 when it is turned off during the receive mode.

Aside from the noted features, the fourth embodiment of the RF switch circuit 124 is otherwise substantially the same as that of the first embodiment 42 discussed above. The similarities include the activation and deactivation of the first and second transistors Q1, Q2 and attendant parasitic capacitances of such components in different states, as well as the features of the compensation inductor L1, DC blocking capacitors, and so forth. The details thereof have been discussed above, and will not be repeated here.

Figure 16:
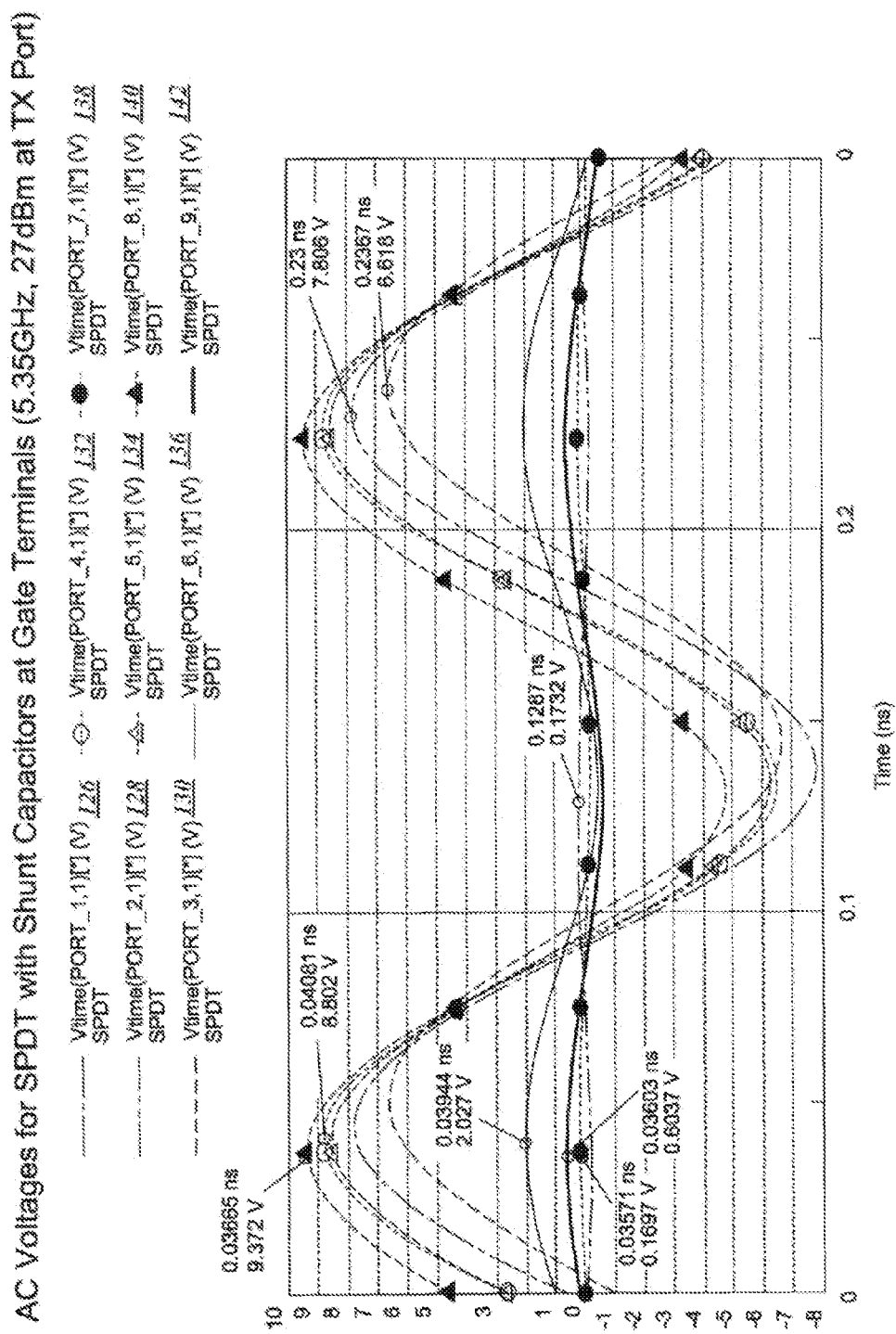
FIG. 16 is a graph illustrating simulated AC voltages at the select port shown in the schematic diagram of the fourth embodiment of the RF switch circuit shown in FIG. 15.

The graph of FIG. 16 includes plots of the simulated measurements taken from the various measurement ports P1-P9 for a 27 dBm signal at 5.35 GHz. There is a plot 126 from the transmit port 12, a plot 128 from the receive port 14, a plot 130 from the antenna port 16. Furthermore, there are plots for simulated measurements from the first transistor Q1, including plot 132 of the source node 28, a plot 134 of the drain node 30, and a plot 136 of the gate node 26. There are plots for simulated measurements from the second transistor Q2, including plot 138 of the source node 34, a plot 140 of the drain node 36, and a plot 142 of the gate node 32. As shown in the plots, the voltage swing across the gate node 32 and the source node 34 is maintained below the threshold level, that is, less than 0.5 V. Therefore, the second transistor Q2 is never activated, and there is a high impedance between the drain node 36 and the source node 34.

Figure 17:
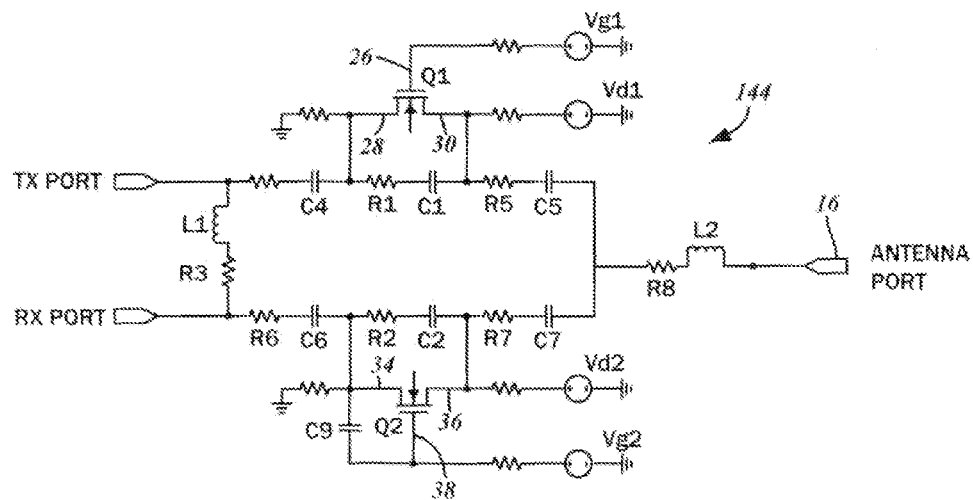
FIG. 17 is a schematic diagram of a fifth embodiment of the RF switch circuit including a transistor gate-source capacitor.

FIG. 17 is a schematic diagram of a fifth embodiment of the RF switch circuit 144. This variation includes a feed-forward capacitor C9 inserted between the gate node 32 and the source node 34 of the second transistor Q2. It is contemplated that the voltage swing between the terminals of the second transistor Q2, as well as intermodulation distortion, are reduced at high transmit power levels. In further detail, the feed-forward capacitor C9 reduces the impedance and the voltage across the gate node 32 and the source node 34 of the second transistor Q2 when the voltage at the antenna port 16 peaks. That is, the second transistor Q2 is prevented from being turned on by the transmit signal when it should otherwise be off, since the receive enable source 24 is not deliberately activated.

With respect to general functionality, the fifth embodiment of the RF switch circuit 144 is otherwise substantially the same as that of the first embodiment 42. Such similarity includes the activation and deactivation of the first and second transistors Q1, Q2 and attendant parasitic capacitances of such components in different states, as well as the features of the compensation inductor L1, DC blocking capacitors, and so forth. Because the details thereof have been discussed above, they will not be repeated here.

Figure 18:
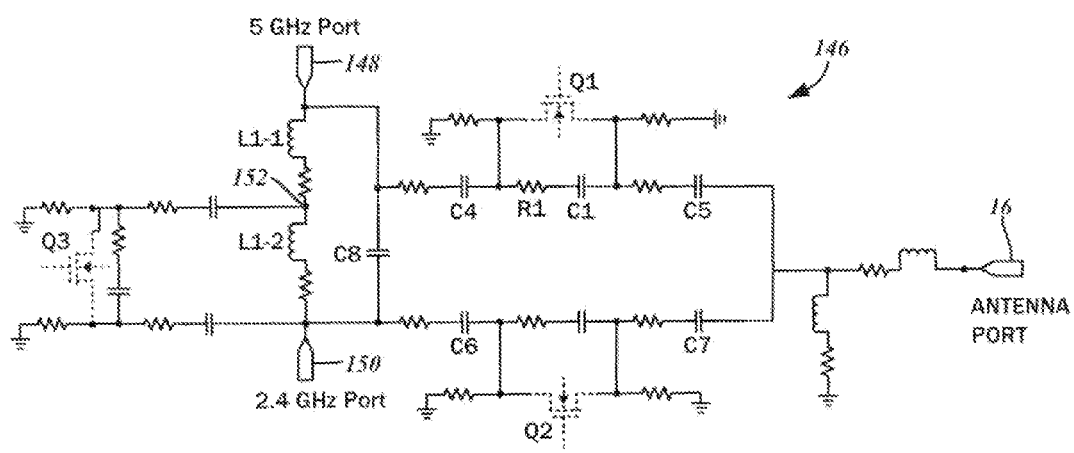
FIG. 18 is a schematic diagram of a sixth embodiment of the RF switch circuit configured as a dual-band 2.4 GHz/5 Ghz switch.

Referring now to the schematic diagram of FIG. 18, a sixth embodiment of the RF switch circuit 146 contemplates a dual-band single pole double throw switch configured for the 2.4 GHz and 5 GHz operating frequencies of a WLAN implementation. The compensation inductor L1 from the earlier described embodiments is split into a first segment L1-1 and a second segment L1-2. The RF switch circuit 146 includes a switching transistor Q3, the details pertaining to the connection of which will be discussed further below. The first segment L1-1 is connected to a first or 5 GHz port 148, and the second segment L1-2 is connected to a second or 2.4 GHz port

150. The first segment L1-1 is connected to the second segment L1-2 at a first junction 152.

Based upon the operational principles of the compensation inductor L1 discussed above, the first segment L1-1 has a value for tuning the performance at the WLAN 5 GHz operating frequency band, and the combination of the first segment L1-1 and the second segment L1-2 in series has a value for tuning the performance at the WLAN 2.4 GHz operating frequency band. By way of example only and not of limitation, the first segment L1-1 has an inductance of 3.4 nH and an associated resistive loss of 5.8 Ohm, and the second segment L1-2 has an inductance of 8 nH and an associated resistive loss of 14 Ohm. Additionally, there is a capacitor C8 having an exemplary value of 0.1 pF connected between the first port 148 and the second port 150 so that the values of the inductance may be kept at levels suitable for on-die implementation.

The source and drain terminals of the transistor Q3 is connected to the first junction 152 and the second port 150. When the first transistor Q1 is turned on, and there is a 5 GHz signal on the first port 148, the switching transistor Q3 is also turned on to provide an AC shunt path across the first segment L1-1. Thus, the overall inductance becomes the first segment L1-1, and this is understood to tune out the parasitic capacitance between the first port 148 and the second port 150 at 5 Ghz. When the second transistor Q2 is turned on and there is a 2.4 GHz signal on the second port 150, the switching transistor Q3 is turned off. The overall inductance becomes a sum of the first segment L1-1 and the second segment L1-2, and likewise tunes out the parasitic capacitance between the first port 148 and the second port 150 at 2.4 GHz.

In all other respects, the sixth embodiment of the RF switch circuit 146 is otherwise substantially the same as that of the first embodiment 42 discussed above. The similarities include the activation and deactivation of the first and second transistors Q1, Q2 and attendant parasitic capacitances of such components in different states, as well as the features of the compensation inductor L1, DC blocking capacitors, and so forth. The details thereof have been discussed above, and will not be repeated.

Figure 19:
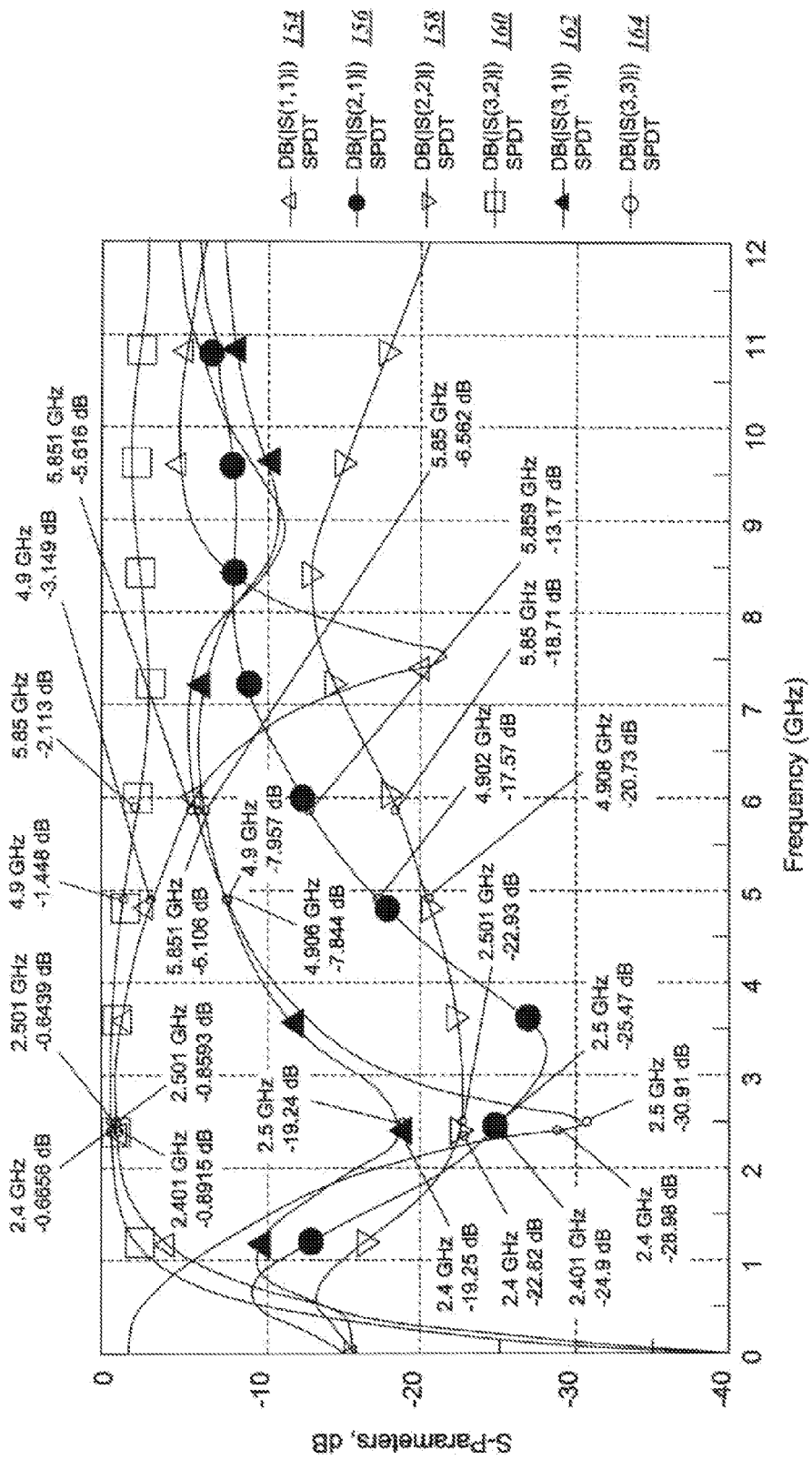
FIG. 19 is a graph illustrating the S-parameter simulation results for the sixth embodiment of the RF switch shown in FIG. 18 in which a 2.4 GHz mode is enabled and a 5 GHz mode is disabled.
Figure 20:
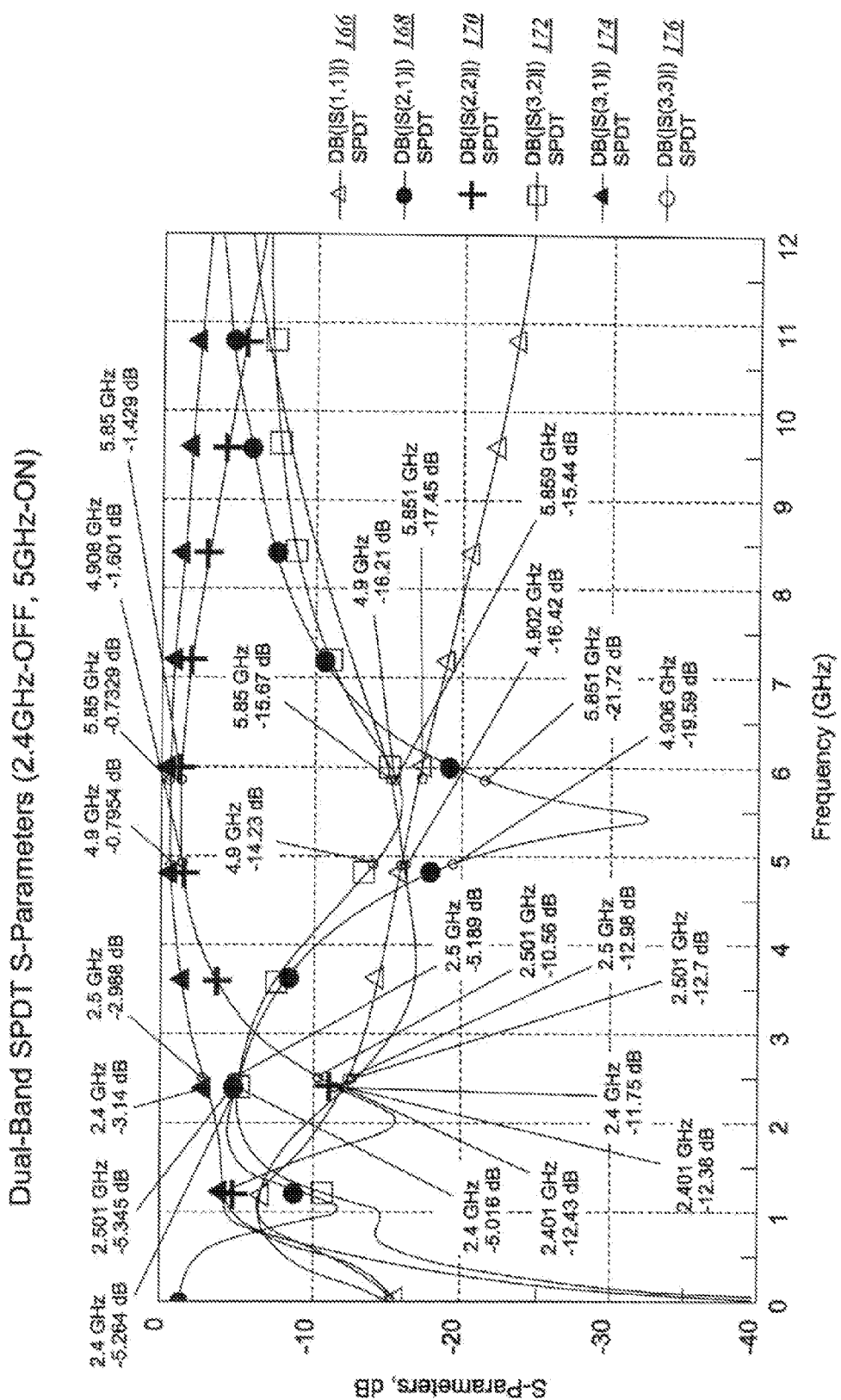
FIG. 20 is a graph illustrating the S-parameter simulation results for the sixth embodiment of the RF switch shown in FIG. 18 in which the 2.4 GHz mode is disabled and the 5 GHz mode is enabled.

With both the 2.4 GHz mode and the 5 GHz mode, there is a small insertion loss associated with the respective signal paths, and the isolation and matching characteristics are similar to those of the first embodiment of the RF switch circuit 42. In further detail, the graph of FIG. 19 shows the S-parameters from the simulation of the RF switch circuit 146 for the activated 2.4 GHz mode and deactivated 5 GHz mode, and includes a plot of a first port reflection coefficient 154 (S11), a first port to second port gain 156 (S21), a second port reflection coefficient 158 (S22), an antenna port to second port forward gain 160 (S32), an antenna port to first port reverse gain 162 (S31), and an antenna port reflection coefficient 164 (S33). The graph of FIG. 20 also shows the S-parameters from the simulation of the RF switch circuit 146, but for the activated 5 GHz mode and the deactivated 2.4 GHz mode. There is a plot of a first port reflection coefficient 166 (S11), a first port to second port gain 168 (S21), a second port reflection coefficient 170 (S22), an antenna port to second port forward gain 172 (S32), an antenna port to first port reverse gain 174 (S31), and an antenna port reflection coefficient 176 (S33).

Figure 21:
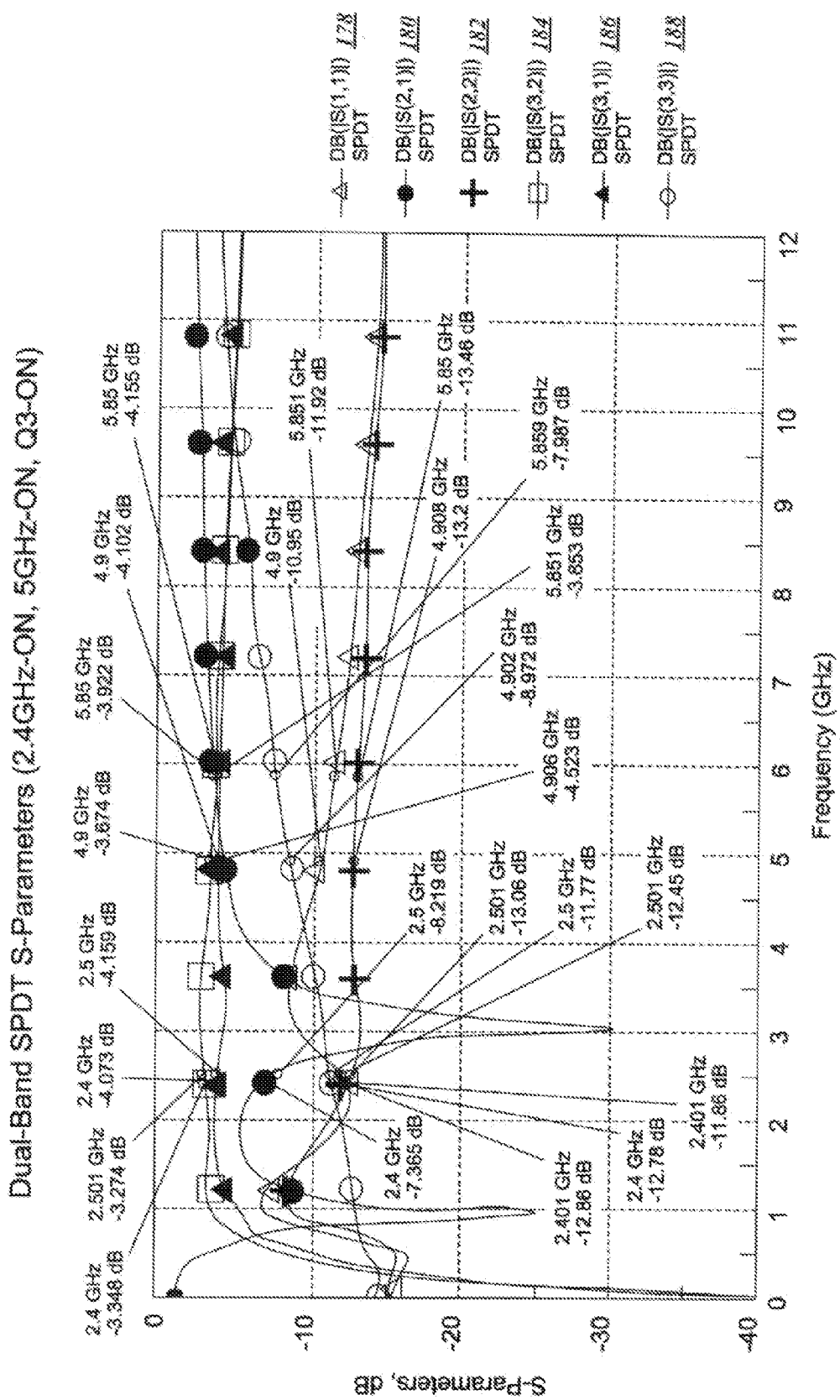
Figure 22:
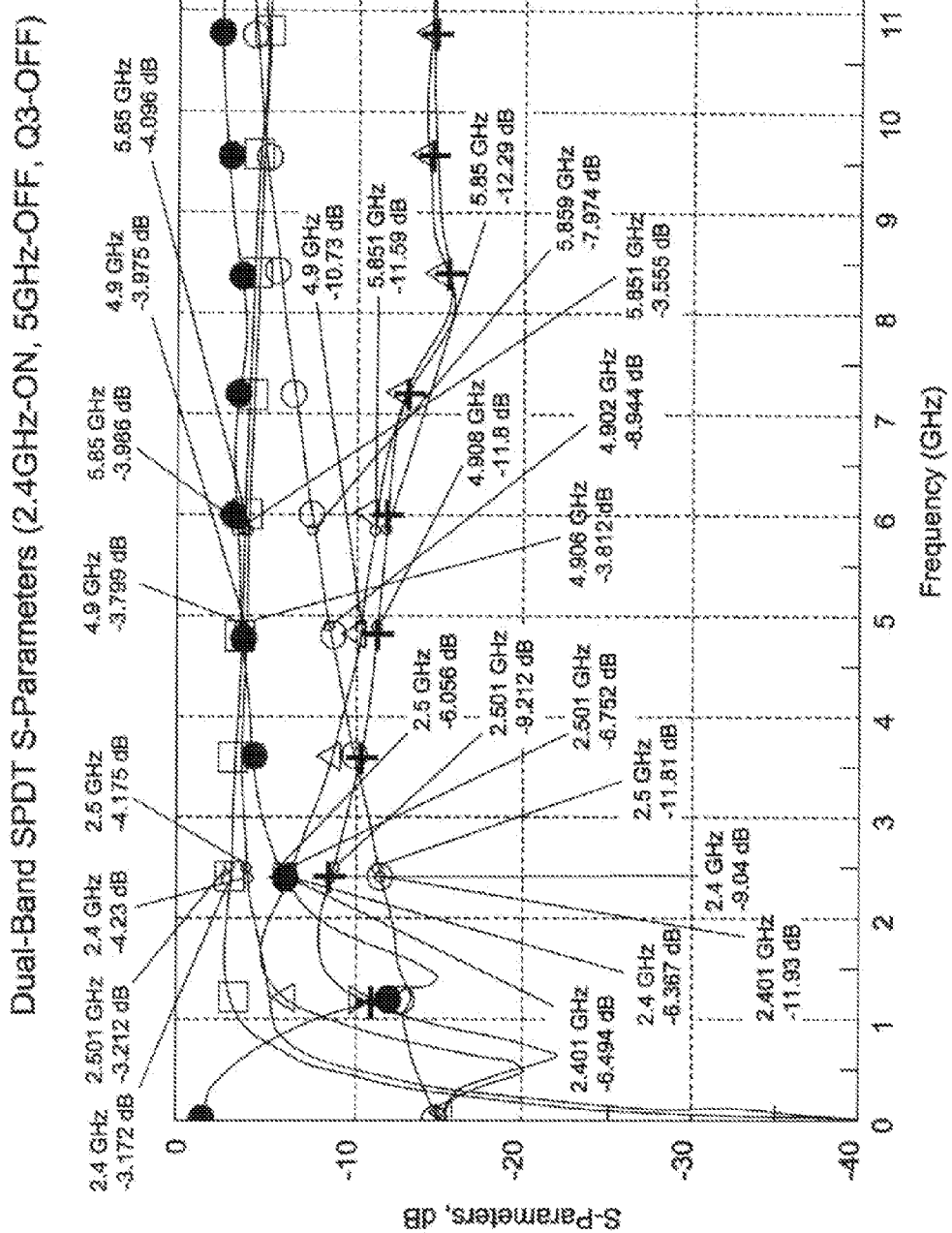

It is also contemplated that the switching transistor Q3 may be activated in a manner opposite to the logic for the respective operating frequency modes described above. The graph of FIG. 21 shows the S-parameters from the simulation of the RF switch circuit 146 for the activated 2.4 GHz mode, the activated 5 GHz mode, and the activated switching transistor Q3. The graph includes a plot of a first port reflection coefficient 178 (S11), a first port to second port gain 180 (S21), a second port reflection coefficient 182 (S22), an antenna port to second port forward gain 184 (S32), an antenna port to first port reverse gain 186 (S31), and an antenna port reflection coefficient 188 (S33). The graph of FIG. 22 shows the S-parameters from the simulation of the RF switch circuit 146 for the activated 2.4 GHz mode, the deactivated 5 Ghz mode, and the deactivated switching transistor Q3. There is a plot of a first port reflection coefficient 190 (S11), a first port to second port gain 192 (S21), a second port reflection coefficient 194 (S22), an antenna port to second port forward gain 196 (S32), an antenna port to first port reverse gain 198 (S31), and an antenna port reflection coefficient 200 (S33).

Figure 23:
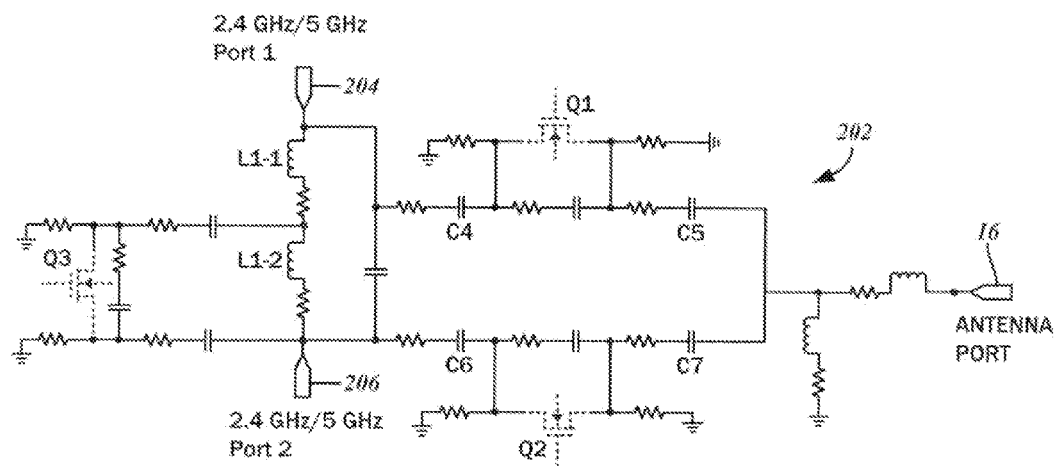
FIG. 23 is a schematic diagram of a seventh embodiment of the RF switch configured as a dual band 2.4 GHz/5 GHz switch with symmetrical ports.

The schematic diagram of FIG. 23 illustrates a seventh embodiment of the RF switch circuit 202, which has a dual-band (2.4 GHz and 5 GHz) single pole, double throw (SPDT) configuration with symmetrical ports Like the sixth embodiment 146, the compensation inductor L1 is split into a first segment L1-1 and a second segment L1-2. The first segment L1-1 is connected to a first combined 2.4 GHz/5 GHz port 204, and the second segment L1-2 is connected to a second combined 2.4 GHz/5 GHz port 206. The first segment L1-1 is connected to the second segment L1-2 at a first junction 152. The switching transistor Q3 is connected to the first junction 152 and the second port 206. As indicated above, the switching transistor Q3 is activated in a manner that only the first segment L1-1 is pertinent to tuning the performance at the 5 GHz operating frequency, and that the combination of the first segment L1-1 and the second segment L1-2 is pertinent to the tuning of the performance at the 2.4 GHz operating frequency. As referenced herein, the performance at the 5 GHz operating frequency refers to both the transmit mode and the received mode therefor. Similarly, the performance at the 2.4 GHz operating frequency refers to both the transmit mode and the received mode therefor.

The other features of the seventh embodiment of the RF switch circuit 202 is substantially the same as that of the first embodiment 42 discussed above. The similarities include the activation and deactivation of the first and second transistors Q1, Q2 and attendant parasitic capacitances of such components in different states, as well as the features of the compensation inductor L1, DC blocking capacitors, and so forth. Because these details have been discussed, no further mention of the same will be made.

Figure 24:
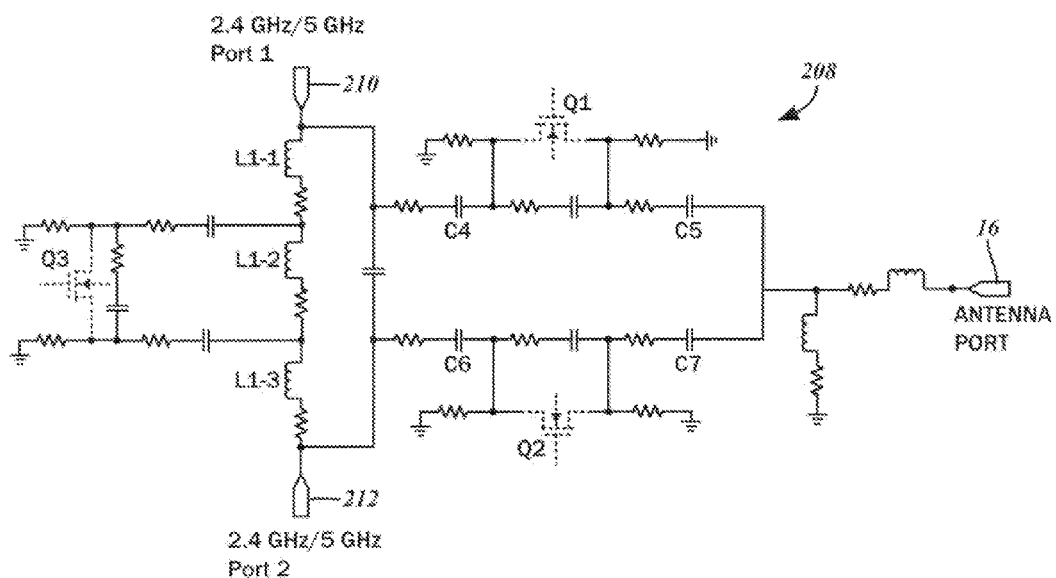
FIG. 24 is a schematic diagram of an eighth embodiment of the RF switch with an alternative configuration for a dual band 2.4 GHz/5 GHz switch with symmetrical ports.

FIG. 24 is a schematic diagram of an eighth embodiment of the RF switch circuit 208, which is configured as a dual-band single port double throw switch with symmetrical ports for both 2.4 GHz and 5 GHz operation. The compensation inductor L1 is split into a first segment L1-1, a second segment L1-2, and a third segment L1-3. The first segment L1-1 is connected to a first 2.4 GHz and 5 GHz port 210. The third segment L1-3 is connected to a second 2.4 GHz and 5 GHz port 212. The second segment L1-2 is connected to the first segment L1-1 at a first junction 214, and the second segment L1-2 is connected to the third segment L1-3 a second junction 216.

The various segments L1-1, L1-2, and L1-3 have inductances that can be selectively modified depending upon the state of a switching transistor Q3. The source and drain terminals of the switching transistor Q3 are connected to the first junction 214 and the second junction 216, which is understood to prevent parasitic leakage through the switching transistor Q3. With the switching transistor Q3 enclosed by the first segment L1-1, and the third segment L1-3, the impedance through possible leakage paths are increased and reduce insertion loss. The series chain comprised of the first segment L1-1 and the second segment L1-2 is tuned for optimal performance at the 5 GHz operating frequency to tune out parasitic capacitance from the first or second transistors Q1, Q2. In this state, the switching transistor Q3 is activated, providing a shunt across the second segment L1-2. On the other hand, the combined series chain of the first segment L1-1, the second segment L1-2, and the third segment L1-3 is tuned for optimal performance at the 2.4 GHz operating frequency to tune out parasitic capacitance. In this case, the switching transistor Q3 is deactivated.

Otherwise, the features of the eighth embodiment of the RF switch circuit 208 is substantially the same as that of the first embodiment 42 discussed above. Again, the similarities include the activation and deactivation of the first and second transistors Q1, Q2 and attendant parasitic capacitances of such components in different states, as well as the features of the compensation inductor L1, DC blocking capacitors, and so forth.

Figure 25:
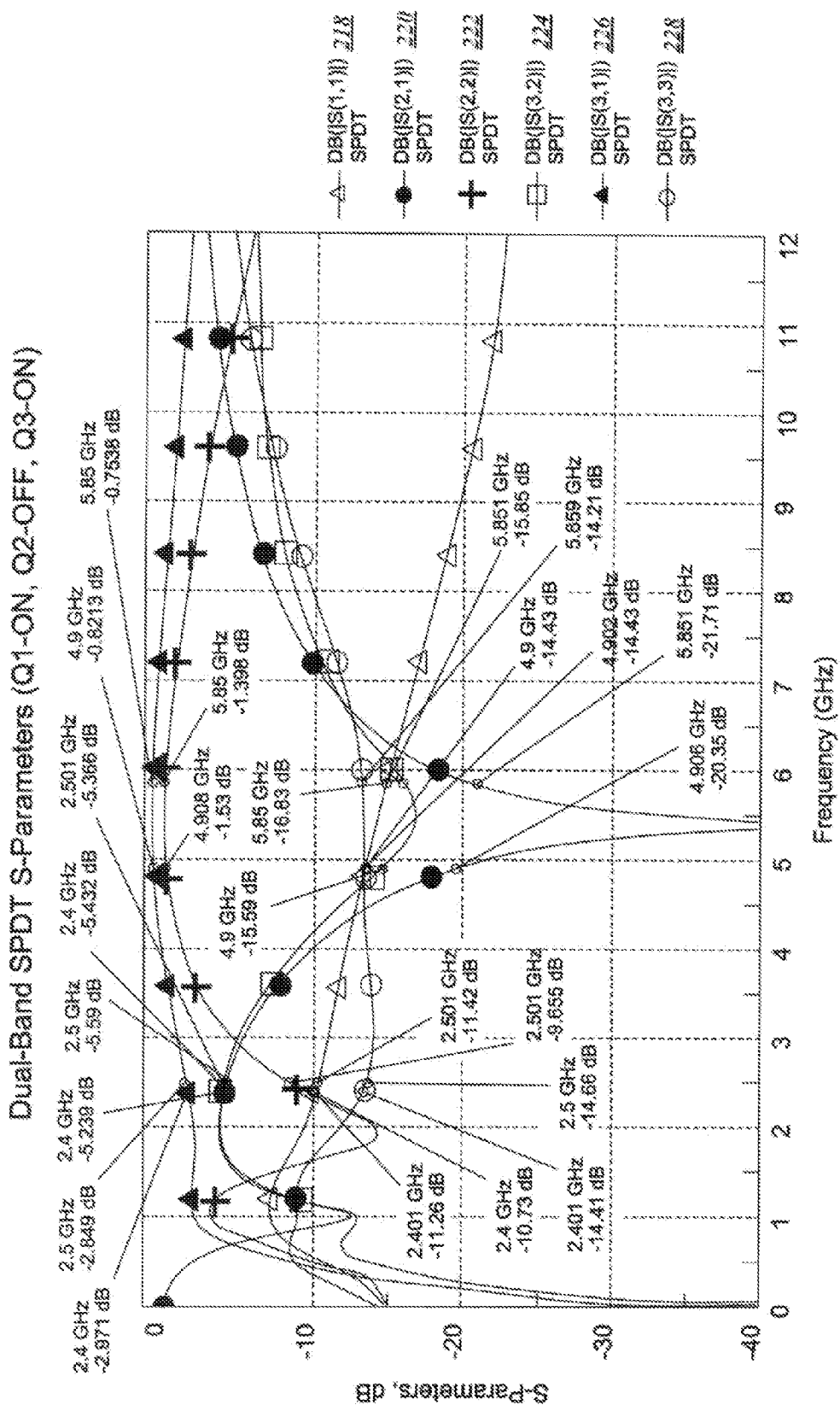
Figure 26:
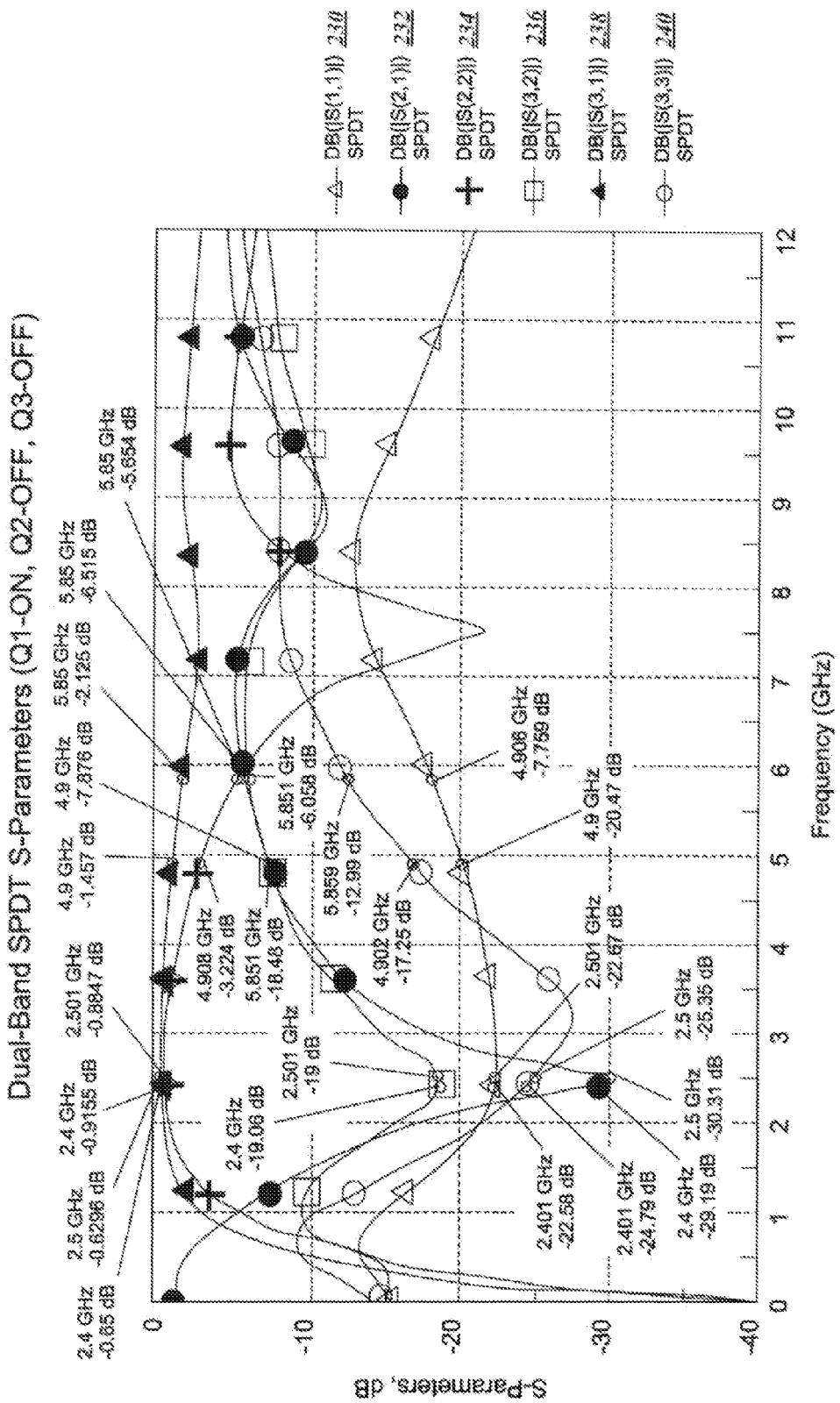
FIG. 26 is a graph illustrating the S-parameter simulation results for the eighth embodiment of the RF switch shown in FIG. 24 in which the 2.4 GHz mode is disabled, the 5 GHz mode is enabled, and the third transistor is off.

There is a small insertion loss in the 2.4 GHz mode and the 5 GHz modes and the respective signal paths, with the isolation and matching characteristics being similar to those of the first embodiment of the RF switch circuit 42. The graph of FIG. 25 shows the S-parameters from the simulation of the RF switch circuit 208 in which first transistor Q1 is activated, the second transistor Q2 is deactivated, and the switching transistor Q3 is deactivated. There is a plot of a first port reflection coefficient 218 (S11), a first port to second port gain 220 (S21), a second port reflection coefficient 222 (S22), an antenna port to second port forward gain 224 (S32), an antenna port to first port reverse gain 226 (S31), and an antenna port reflection coefficient 228 (S33). The graph of FIG. 26 also shows the S-parameters from the simulation of the RF switch circuit 208, but for the activated first transistor Q1, the deactivated second transistor Q2, and the deactivated switching transistor Q3. There is a plot of a first port reflection coefficient 230 (S11), a first port to second port gain 232 (S21), a second port reflection coefficient 234 (S22), an antenna port to second port forward gain 236 (S32), an antenna port to first port reverse gain 238 (S31), and an antenna port reflection coefficient 240 (S33).

Figure 27:
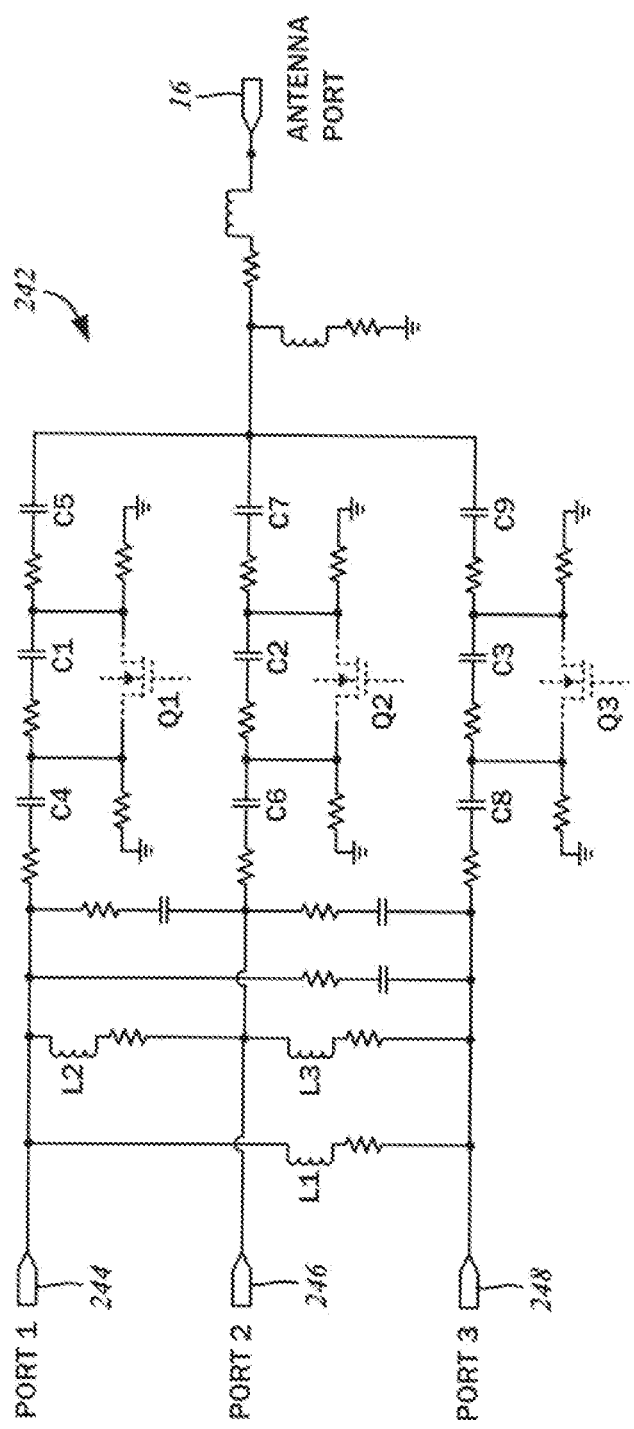
FIG. 27 is a schematic diagram of the RF switch with a single pole, triple throw configuration in accordance with a ninth embodiment of the present disclosure.
Figure 28:
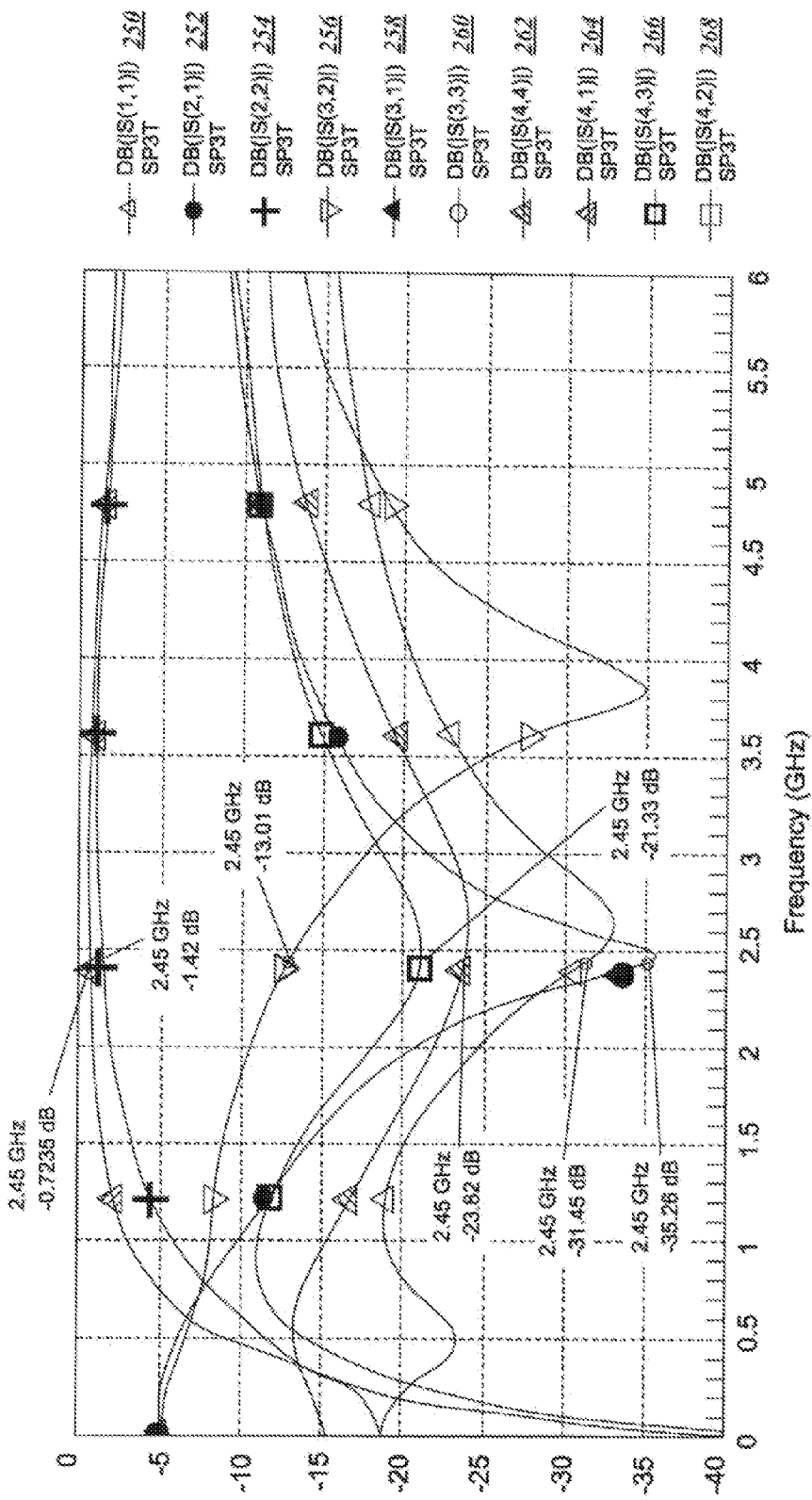
FIG. 28 is a graph illustrating the S-parameter simulation results for the ninth embodiment of the RF switch shown in FIG. 27 in which its first transistor is on, its second transistor is off, and its third transistor is off.

The present disclosure also contemplates a single pole, triple throw switch configuration, which is shown in FIG. 27 as a ninth embodiment of the RF switch circuit 242. There is a first port 244, a second port 246, and a third port 248, each of which are understood to be connectable to a transmission line to or from the transceiver. There is also the antenna port 16 that is connectable to an external antenna. Generally, the RF switch circuit 242 is understood to selectively connect the first port 244, the second port 246, and the third port 248 to the antenna port 16. In this regard, each of the ports have a separate signal transmission chain associated therewith defined primarily by the respective one of the first transistor Q1, the second transistor Q2, the third transistor Q3, and related DC blocking, biasing, and transistor enable circuit components.

The signal transmission chains of the RF switch circuit 242 are arranged in a star configuration. Where the first port 244 is active, the first transistor Q1 is activated. The signal on the first port 244 is passed to the antenna port 16. As indicated above, a positive voltage (for a NFET transistor) is applied to the gate of the first transistor Q1 to activate it and provides a low impedance path through to the antenna port 16.

The second transistor Q2 and the third transistor Q3, on the other hand, are turned off. There is little to no voltage applied to the gates of the second and third transistors Q2, Q3, which are biased off with a high voltage applied to the sources and the drains of the same. Regardless of the high-voltage transmit signal on the antenna port 16, the second transistor Q2 and the third transistor Q3 remain off. It is understood that the body or substrate of each of the first transistor Q1, the second transistor Q2, and the third transistor Q3 are tied to ground, or at least the lowest potential of the RF switch circuit 242. Each of the body terminals may also be tied to the source terminal of the respective transistors.

The capacitors C4 and C5, which are connected to the first transistor Q1, are understood to be direct current (DC) blocks for its proper biasing. Specifically, substantially high resistances of greater than 50 Ohm bias the gate, source, and the drain, and block RF signal leaks therethrough. The capacitors C4 and C5 are selected with values to minimize insertion loss, and counteract the inductive impedance of inductor L2 as well as L1. Along these lines, the capacitors C6 and C7 that are connected to the source and the drain of the second transistor Q2, as well as the capacitors C8 and C9 that are connected to the source and the drain of the third transistor Q3 are likewise understood to be direct current (DC) blocks for the proper biasing. The capacitors C4, C6, and C8 are understood to have capacitive values of 6 pF and an associated resistive loss of around 0.15 Ohm. The capacitors C5, C7, and C9, on the other hand, have capacitive values of 8 pF and a resistive loss of around 0.15 Ohm. Each of the transistors Q1, Q2, Q3 has an equivalent associated parasitic capacitance of 100 pF and a resistive loss of 2 Ohm. It will be recognized by those having ordinary skill in the art, however, that these values are presented by way of example only.

There are three separate compensation inductors L1, L2, and L3 arranged in a delta configuration. Specifically, the first compensation inductor L1 is connected to the first port 244 and the third port 248, and is understood to tune out parasitic capacitance between the second port 246 and the third port 248. In one exemplary state with the first port 244 being connected to the antenna port 16 due to the first transistor Q1 being activated while the second transistor Q2 and the third transistor Q3 are deactivated, the first compensation inductor L1 sees only the common mode voltage swing at its terminals. The second compensation inductor L2 is connected to the first port 244 and the second port 246, and tunes out parasitic capacitance between the first port 244 and the second port 246. The third compensation inductor L3 is connected between the second port 246 and the third port 248, and tunes out the parasitic capacitance between the first port 244 and the second port 246.

In the ninth embodiment of the RF switch circuit 242, it is contemplated that the one, two, or three of the first port 244, the second port 246, and the third port 248 may be connected simultaneously to the antenna port 16. The S-parameters from the various simulations of such connections are shown in the graphs of FIG. 28, FIG. 29, FIG. 30, and FIG. 31. In further detail, the graph of FIG. 28 includes various plots of a scenario where the first transistor Q1 is on, the second transistor Q2 is off, and the third transistor Q3 is off. These plots include a first port reflection coefficient 250 (S11), a second port to first port gain 252 (S21), a second port reflection coefficient 254 (S22), a third port to second port gain 256 (S32), a third port to first port gain 258 (S31), a third port reflection coefficient 260 (S33), an antenna port reflection coefficient 262 (S44), an antenna port to first port gain 264 (S41), an antenna port to third port gain 266 (S43), and an antenna port to second port gain 267 (S42).

Figure 29:
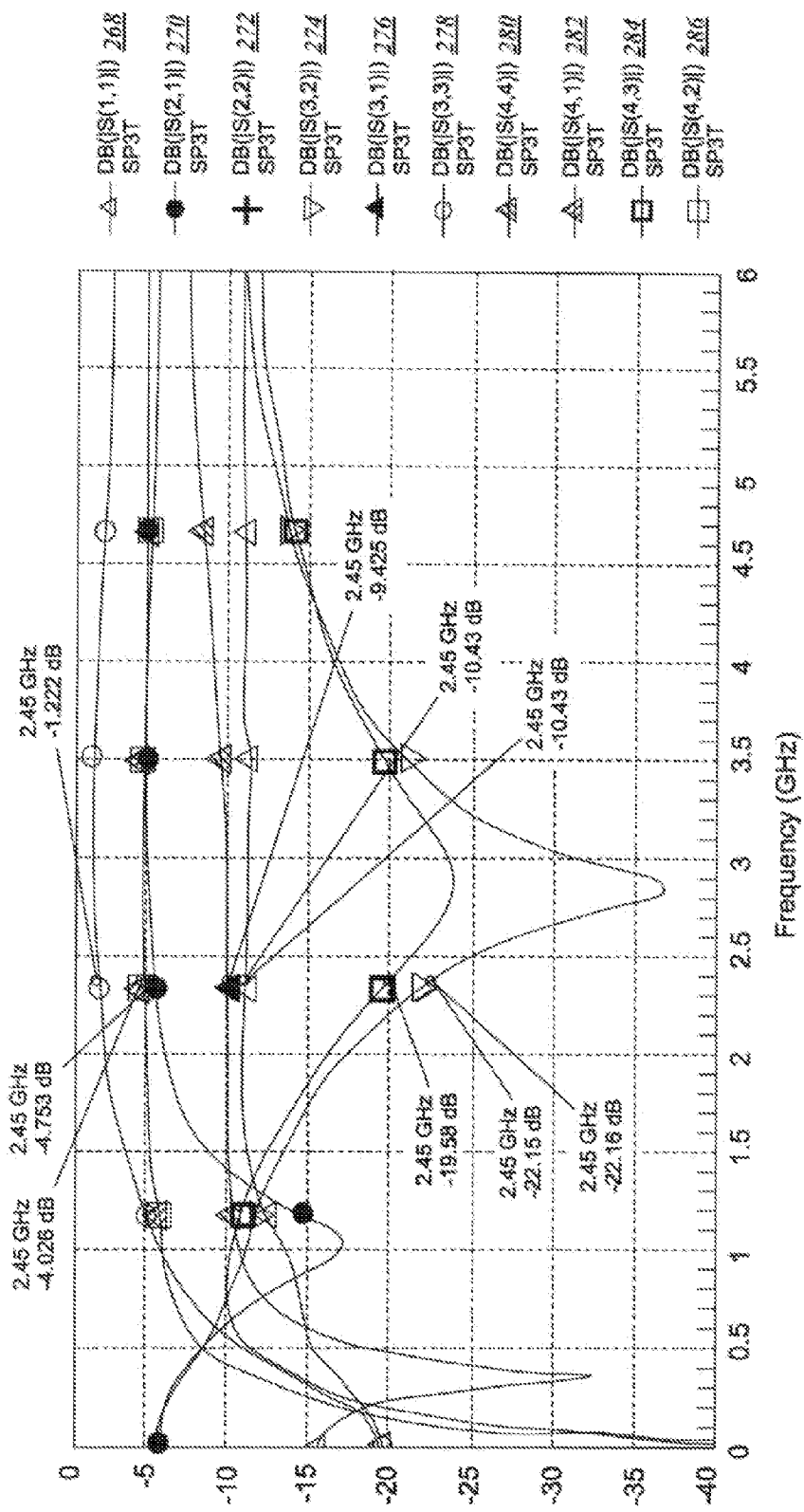
FIG. 29 is a graph illustrating the S-parameter simulation results for the ninth embodiment of the RF switch shown in FIG. 27 in which its first transistor is on, its second transistor is on, and its third transistor is off.

The graph of FIG. 29 includes various plots of a scenario in which the first transistor Q1 is on, the second transistor Q2 is on, and the third transistor Q3 is off. These plots include a first port reflection coefficient 268 (S11), a second port to first port gain 270 (S21), a second port reflection coefficient 272 (S22), a third port to second port gain 274 (S32), a third port to first port gain 276 (S31), a third port reflection coefficient 278 (S33), an antenna port reflection coefficient 280 (S44), an antenna port to first port gain 282 (S41), an antenna port to third port gain 284 (S43), and an antenna port to second port gain 286 (S42).

Figure 30:
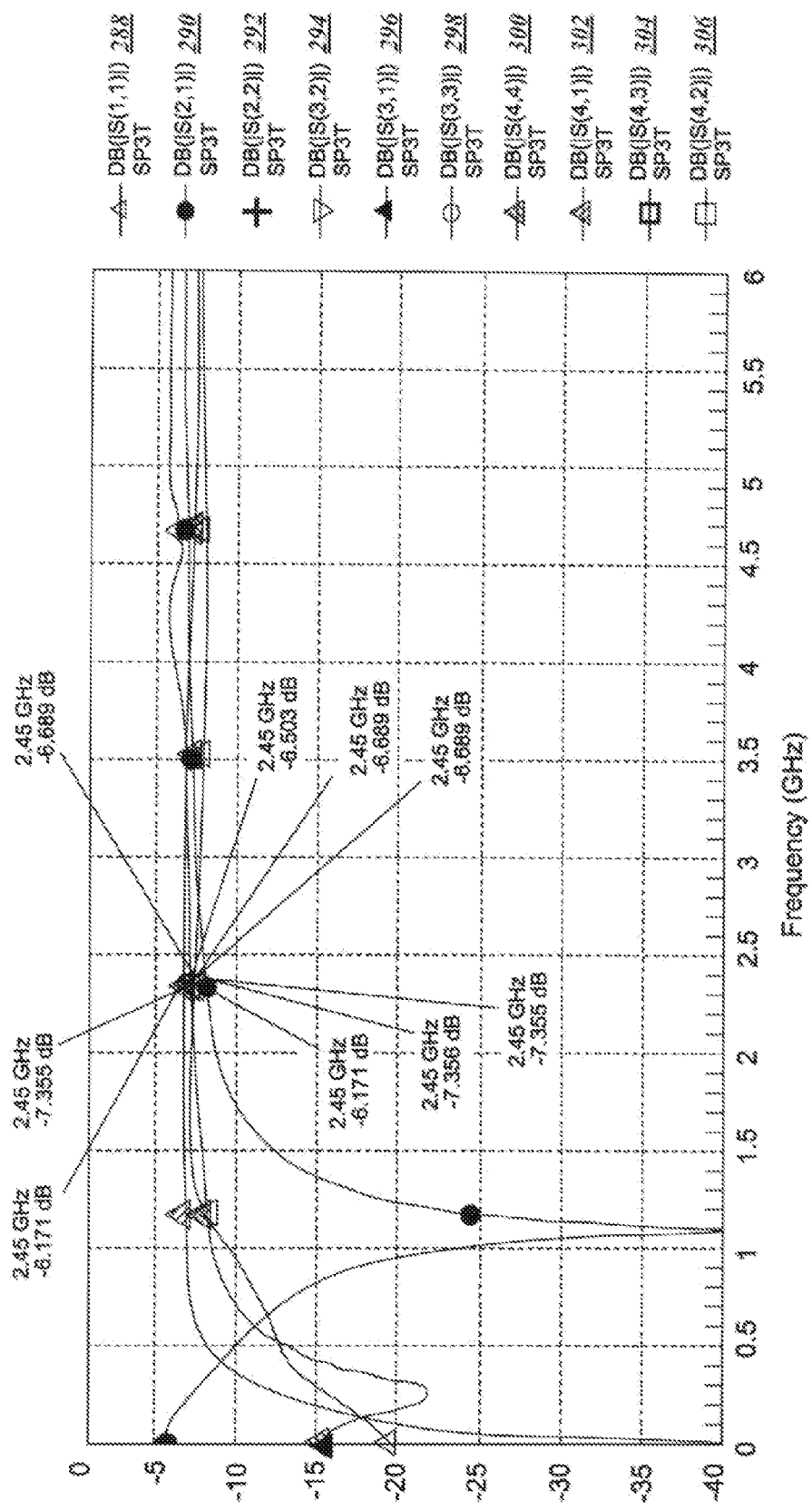

The graph of FIG. 30 includes various plots of a scenario in which the first transistor Q1 is on, the second transistor Q2 is on, and the third transistor Q3 is on. These plots include a first port reflection coefficient 288 (S11), a second port to first port gain 290 (S21), a second port reflection coefficient 292 (S22), a third port to second port gain 294 (S32), a third port to first port gain 296 (S31), a third port reflection coefficient 298 (S33), an antenna port reflection coefficient 300 (S44), an antenna port to first port gain 302 (S41), an antenna port to third port gain 304 (S43), and an antenna port to second port gain 306 (S42).

Figure 31:
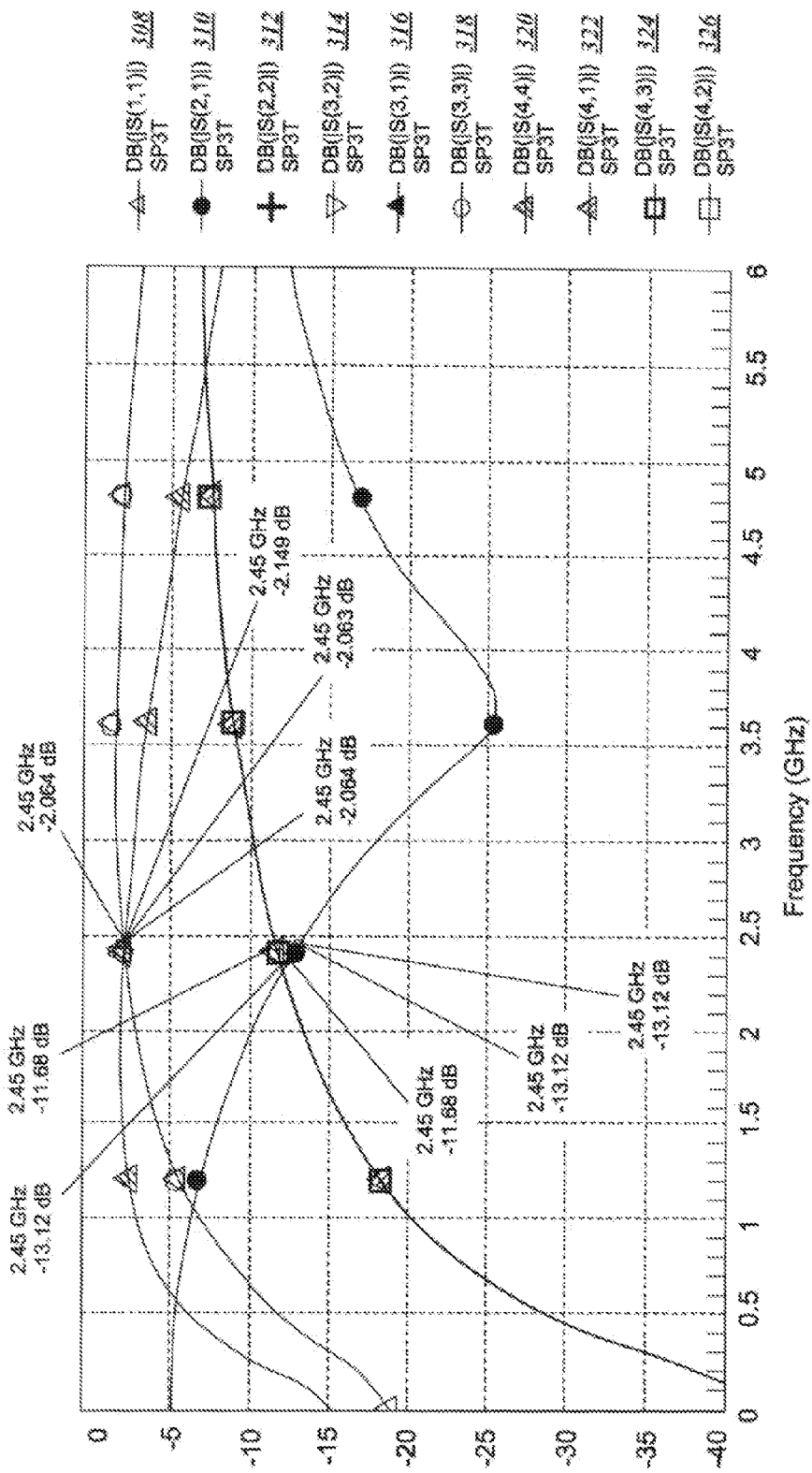
FIG. 31 is a graph illustrating the S-parameter simulation results for the ninth embodiment of the RF switch shown in FIG. 27 in which its first transistor is off, its second transistor is off, and its third transistor is off.

The graph of FIG. 31 includes various plots of a scenario in which the first transistor Q1 is on, the second transistor Q2 is on, and the third transistor Q3 is on. These plots include a first port reflection coefficient 308 (S11), a second port to first port gain 310 (S21), a second port reflection coefficient 312 (S22), a third port to second port gain 314 (S32), a third port to first port gain 316 (S31), a third port reflection coefficient 318 (S33), an antenna port reflection coefficient 320 (S44), an antenna port to first port gain 322 (S41), an antenna port to third port gain 324 (S43), and an antenna port to second port gain 326 (S42).

Figure 32:
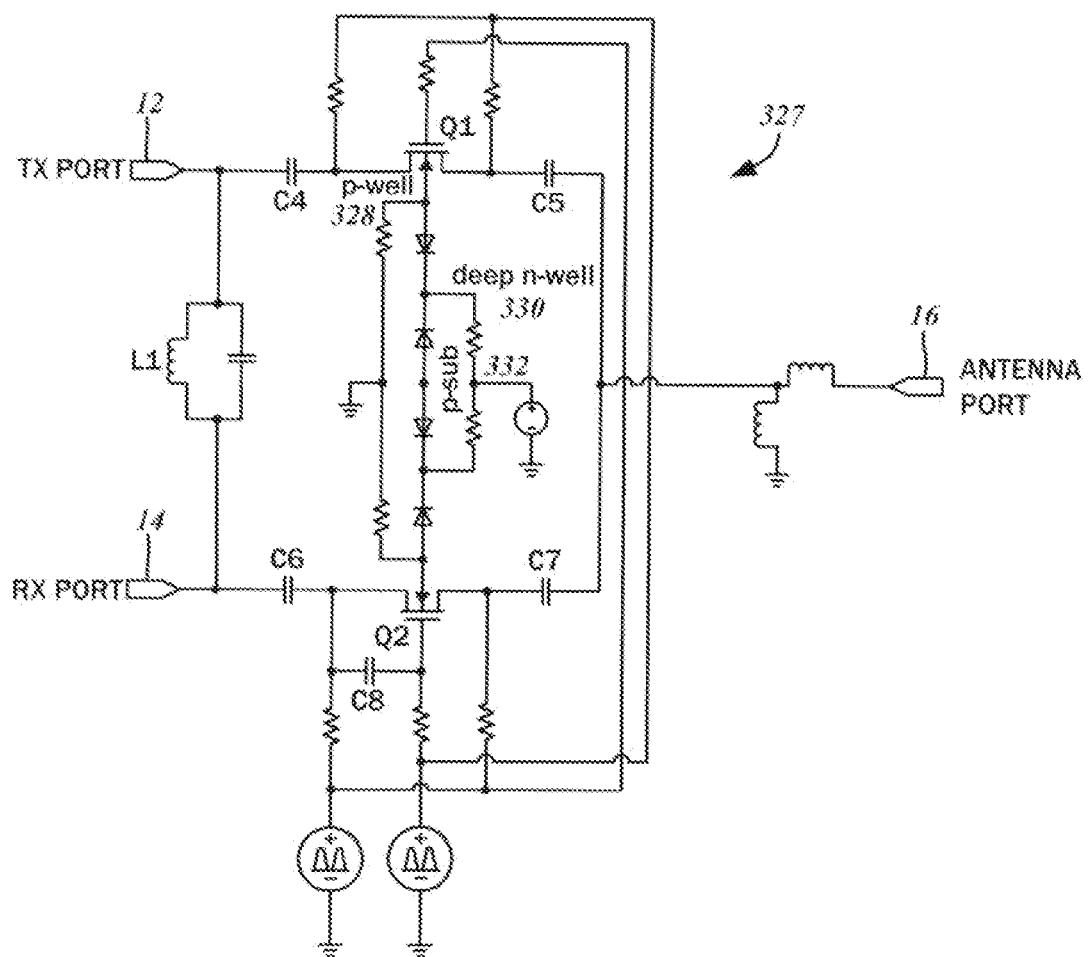
FIG. 32 is a schematic diagram of the RF switch with a single pole, double throw configuration implemented with triple well negative metal oxide semiconductor transistors in accordance with a tenth embodiment of the present disclosure.

In the second embodiment of the RF switch circuit 78 discussed above with reference to FIG. 4, the first transistor Q1 and the second transistor Q2 were noted as being on negative channel field effect transistors. This circuit may also be implemented with triple-well negative channel metal oxide semiconductor transistors, and is shown in the tenth embodiment of the RF switch circuit 327 of FIG. 32. A body terminal or p-well 328 is surrounded by a deep n-well 330 that is isolated from the p-substrate 332. The triple-well NMOS transistors are understood to reduce parasitic capacitance from the body to the substrate, with a corresponding reduction of leakage and better isolation between the ports.

There are resistors added between the body 328 and ground. The values of such resistors may be greater than 10K Ohm. Moreover, the n-well may be tied to the highest potential in order to provide resistive alternative current (AC) floating to the body 328 and reduce signal leakage. The junction diodes are also prevented from turning on as a result of large RF signals, thereby improving linearity. A feed-forward capacitor C8 like the one utilized in the fifth embodiment of the RF switch circuit 144 (C9) may be connected between the source and the gate of the second transistor Q2. As indicated above, the feed-forward capacitor C8 prevents a transmit signal from turning on the second transistor Q2 when it is otherwise biased off.

The features of the tenth embodiment of the RF switch circuit 327 are substantially the same as that of the first embodiment 42 discussed above. The similarities include the activation and deactivation of the first and second transistors Q1, Q2 and attendant parasitic capacitances of such components in different states, as well as the features of the compensation inductor L1, DC blocking capacitors, and so forth.

Figure 33:
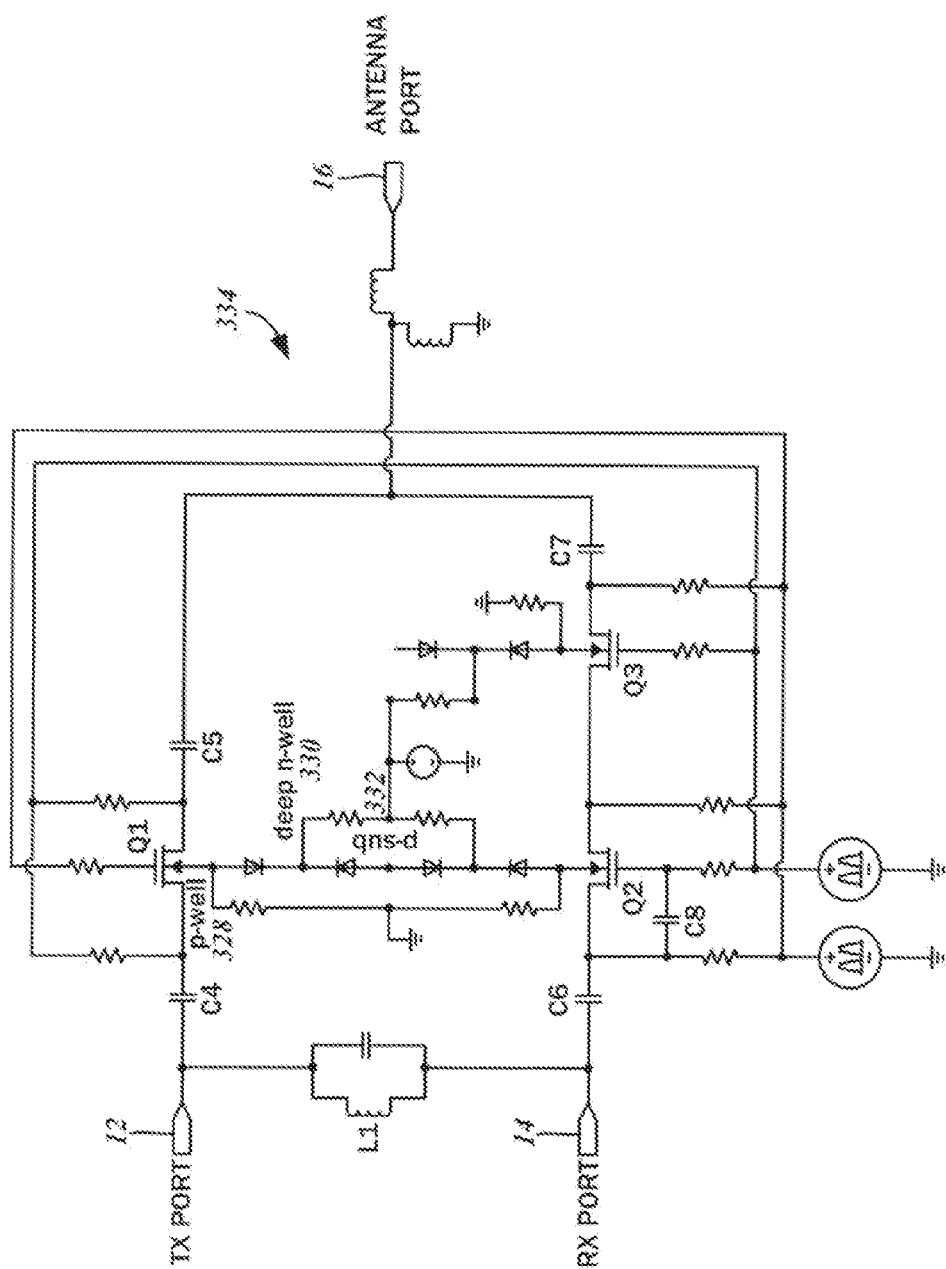
FIG. 33 is a schematic diagram of an RF switch implemented with triple well negative metal oxide semiconductor transistors and includes two of such transistors in a receive chain according to an eleventh embodiment of the present disclosure.

A variation of the tenth embodiment of the RF switch circuit 327 with improved power handling capabilities is contemplated as shown in the schematic diagram of FIG. 33. The eleventh embodiment 334 is substantially similar as the tenth embodiment, except for the addition of a third transistor Q3 in the receive chain. In this regard, the third transistor Q3 is activated in the receive mode, that is, when the receive enable source 24 is on. The third transistor Q3 likewise has a triple-well negative channel metal oxide semiconductor structure, and is connected in series with the second transistor Q2. It is contemplated that leakage through the otherwise deactivated transistor Q2 may be increased by a transmit signal at the antenna port 16 having a high power level. In particular, the transistor Q2 may be turned on momentarily at a peak voltage swing that is greater than the threshold voltage level. With the addition of the third transistor Q3, the high-voltage stress to the deactivated transistors (Q2, Q3) is divided, dispersed or otherwise mitigated. It is understood that this improves power handling capability and linearity.

The remaining features of the eleventh embodiment of the RF switch circuit 334 are substantially the same as that of the first embodiment 42 discussed above. The similarities include the activation and deactivation of the first and second transistors Q1, Q2 and attendant parasitic capacitances of such components in different states, as well as the features of the compensation inductor L1, DC blocking capacitors, and so forth.

Figure 34:
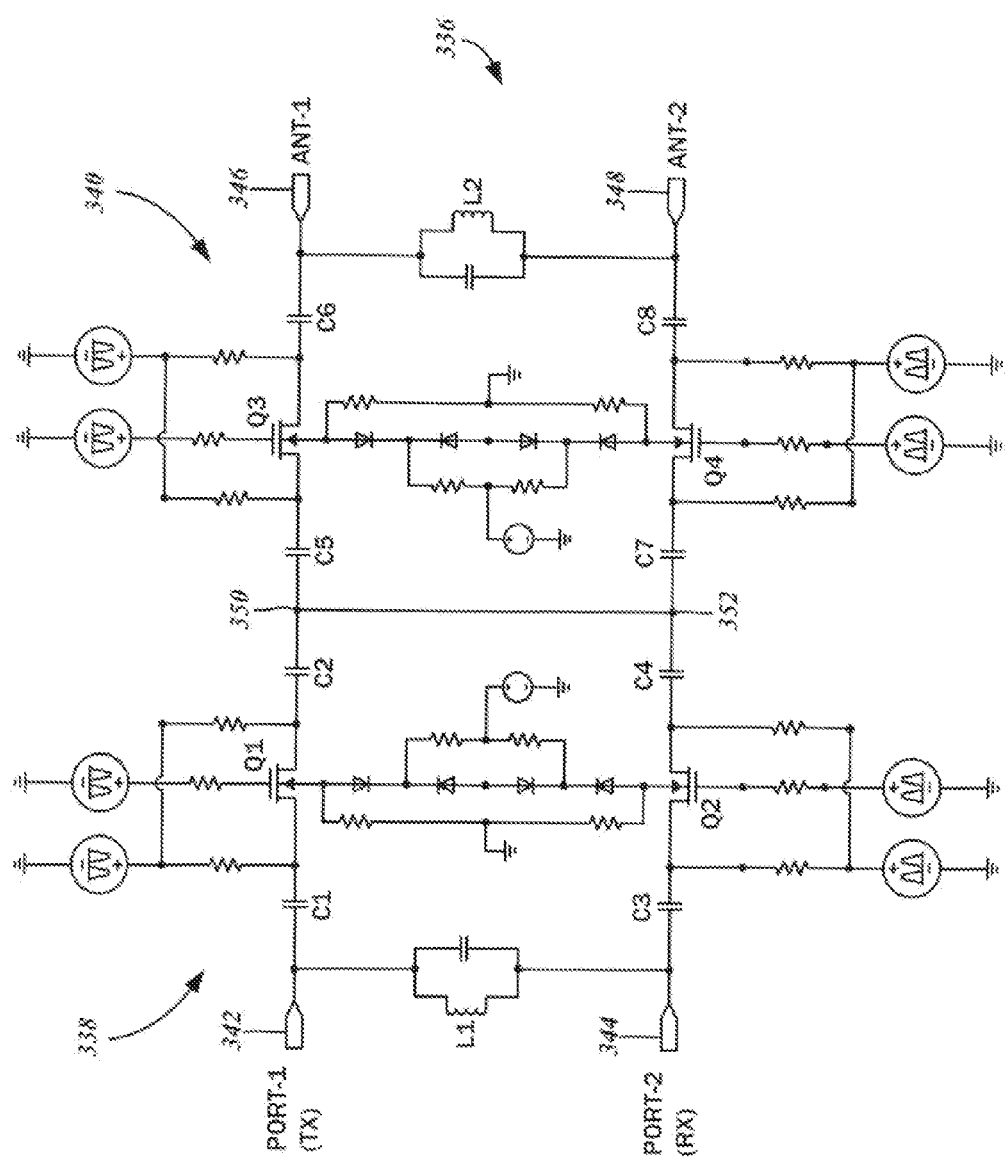
FIG. 34 is a schematic diagram of the RF switch with a double pole, double throw configuration implemented with triple well negative metal oxide semiconductor transistors in accordance with a twelfth embodiment of the present disclosure.

Other switch structures besides single pole, double throw are also possible with the tenth embodiment of the RF switch circuit 327 as a base or fundamental module. Referring to the schematic diagram of FIG. 34, there is depicted a double pole, double throw switch in accordance with a twelfth embodiment of the RF switch circuit 336, which is generally comprised of a first switching segment 338, and a second switching segment 340. With respect to external connections, the first switching segment 338 includes a first or transmit port 342, and a second or receive port 344. The second switching segment 340 includes a first antenna port 346, and a second antenna port 348.

Both the first switching segment 338 and the second switching segment 340 each have a configuration that is essentially the same as that of the tenth embodiment of the RF switch circuit 327. The first switching segment 338 includes the first transistor Q1 that is connected to the first port 342, as well as a first enable line that activates and deactivates the first transistor Q1. Between the first switching segment 338 and the second switching segment 340, or as part of one or the other, there is a first segment junction 350. The first transistor Q1 is connected to the first segment junction 350. The first switching segment 338 also includes the second transistor Q2 that is connected to the second port 344. The second transistor Q2 is activated and deactivated via a second enable line. Again, between the first switching segment 338 and the second switching segment 340, or as part of one or the other, there is a second segment junction 352, to which the second transistor Q2 is connected. The first switching segment 338 includes various decoupling capacitors C1, C, C3, and C4. The compensation inductor L1 is connected between the first port 342 and the second port 344 to compensate for parasitic capacitance from an inactive one of the first transistor Q1 and the second transistor Q2.

The second switching segment 340 includes a third transistor Q3 connected to the first antenna port 346 and the first segment junction 350. The third transistor Q3 is configured and connected in a manner that is essentially the same as the first transistor Q1. Furthermore, there is a fourth transistor Q4 connected to the second antenna port 348 and the second segment junction 352. A second inductor is connected between the first antenna port 346 and the second antenna port 348 in order to compensate for parasitic capacitance from an inactive one of the third transistor Q3 and the fourth transistor Q4. Similar to the first switching segment 338, the second switching segment 340 includes various decoupling capacitors C5, C6, C7, and C8, the various functions of which have been discussed previously.

With the foregoing configuration of the twelfth embodiment of the RF switch circuit 336, a transmit signal on the first port 342 may be selectively passed to either the first antenna port 346 or the second antenna port 348. In both cases, the first transistor Q1 is activated. For passing the signal to the first antenna port 346, the third transistor Q3 is activated while the fourth transistor Q4 is deactivated. Furthermore, a signal received on either of the first antenna port 346 or the second antenna port 348 may be passed to the second port 344. In this case, the second transistor Q2 is activated. For the signal from the first antenna port 346 to be passed to the first switching segment 338, the transistor Q3 is activated while the transistor Q4 is deactivated. On the other hand, for the signal from the second antenna port 348 to be passed to the first switching segment 338, the transistor Q4 is activated while the transistor Q3 is deactivated.

Notwithstanding the foregoing description of the twelfth embodiment of the RF switch circuit 336, several different operating modalities are contemplated. For example, one port may be connected to two or three other ports simultaneously. A single transmit signal can be passed to two antennas while at the same time, the signal as incident on the antenna may be passed to the receiver circuitry the other third connection for calibration or power control purposes, among other uses. Based upon the disclosures herein, those having ordinary skill in the art will recognize such alternatives.

Although several variants of RF switch circuits have been disclosed herein, these are by way of example only and not of limitation. Other switch structures are possible that are based upon the inclusion of a compensation inductor between the throw ports of the switch. As shown above, high linearity, or 1 dB compression points of greater than 25 dBm even at low control and bias voltages as low as 2V with low spurious emissions can be achieved.

The particulars shown herein are by way of example only for purposes of illustrative discussion, and are presented in the cause of providing what is believed to be the most useful and readily understood description of the principles and conceptual aspects of the various embodiments set forth in the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A radio frequency (RF) switch circuit with a first port, a first enable line, a second port, a second enable line, and a common antenna port, the switch circuit comprising:
a first transistor connected to the first port, the common antenna port, and the first enable line, the first transistor being selectively activatable in response to a first enable signal applied to the first enable line;
a second transistor connected to the second port, the common antenna port, and the second enable line, the second transistor being selectively activatable in response to a second enable signal applied to the second enable line; and
a first inductor connected across the first port to the second port to compensate for parasitic capacitance between the first port and the second port from an inactive one of the first and second transistors.

2. The switch circuit of claim 1, wherein the first inductor phase shifts a first signal on the first port and is applied to the second port, with the first transistor being activated and the second transistor being deactivated, a leakage of the first signal through the second transistor on the second port being minimized by the phase shifted first signal.

3. The switch circuit of claim 1, wherein capacitive impedance of the second transistor is tuned with inductive impedance of the first inductor at a first operating frequency to generate a parallel resonance isolating the first port from the second port.

4. The switch circuit of claim 1, wherein the activated first transistor is defined by a first equivalent resistance and a first equivalent capacitance, and the deactivated second transistor is defined by a second equivalent resistance and a second equivalent capacitance, the first inductor having a value selected to define a resonance together with the second equivalent capacitance at a first operating frequency.

5. The switch circuit of claim 1, further comprising:
a first electrostatic discharge inductor connected to the antenna port.

6. The switch circuit of claim 1, further comprising:
a first electrostatic discharge inductor connected in series with the first inductor.

7. The switch circuit of claim 1, further comprising:
a first shunt capacitor connected to the first enable line and the first transistor; and
a second shunt capacitor connected to the second enable line and the second transistor.

8. The switch circuit of claim 1, wherein the first port is a transmit port and the second port is a receive port.

9. The switch circuit of claim 1, wherein:
the first port is solely connected to the first transistor and the first inductor; and
the second port is solely connected to the second transistor and the first inductor.

10. The switch circuit of claim 1, wherein the first and second transistors each include a gate connected to the respective first and second enable lines, a source connected to the respective first and second ports, and a drain connected to the antenna port.

11. The switch circuit of claim 10, further comprising:
a first port decoupling capacitor connected to the first port and the source of the first transistor; and
a second port decoupling capacitor connected to the second port and the source of the second transistor.

12. The switch circuit of claim 10, further comprising:
a first antenna port decoupling capacitor connected to the drain of the first transistor and the antenna port; and
a second antenna port decoupling capacitor connected to the drain of the second transistor and the antenna port.

13. The switch circuit of claim 10, further comprising a feed-forward capacitor connected to the gate and the source of the second transistor.

14. The switch circuit of claim 10, wherein the first and second transistors have a structure selected from a group consisting of: metal oxide semiconductor field effect (MOSFET), metal semiconductor field effect (MESFET), and high electron mobility (HEMT).

15. The switch circuit of claim 14, further comprising:
a second electrostatic discharge inductor connected in series with the first inductor.

16. The switch circuit of claim 10, wherein the first and second transistors have a triple-well negative metal oxide semiconductor (N-MOS) field effect structure.

17. The switch circuit of claim 16, further comprising a feed-forward capacitor connected to the gate and the source of the second transistor.

18. The switch circuit of claim 1, wherein:
the first inductor is split and is comprised of a first inductor segment connected to the first port and a second inductor segment connected to the second port, a split junction being defined between the first inductor segment and the second inductor segment.

19. The switch circuit of claim 18, further comprising:
a compensation capacitor connected in parallel to the first inductor.

20. The switch circuit of claim 18, further comprising:
a third transistor connected to the split junction and the second port, the third transistor being selectively activatable to set an overall inductance value of the first inductor equivalent to an inductance value of the first inductor segment, and to set the overall inductance value of the first inductor equivalent to a combination of the inductance value of the first inductor segment and an inductance value of the second inductor segment.

21. The switch circuit of claim 20, wherein the first port corresponds to a first operating frequency and the second port corresponds to a second operating frequency, the third transistor being activated in a first mode for the first operating frequency and the third transistor being deactivated in a second mode for the second operating frequency.

22. The switch circuit of claim 20, wherein the first port is a transmit port and the second port is a receive port, the third transistor being activated in a first mode for a first operating frequency and deactivated in a second mode for the second operating frequency.

23. The switch circuit of claim 1, wherein:
the first inductor is split and is comprised of a first inductor segment connected to the first port, a second inductor segment, and a third inductor segment connected to the second port, a first split junction being defined between the first inductor segment and the second inductor segment, and a second split junction being defined between the second inductor segment and the third inductor segment.

24. The switch circuit of claim 23, further comprising:
a third transistor connected to the first split junction and the second split junction, the third transistor being selectively activatable to set an overall inductance value of the first inductor equivalent to a combination of an inductance value of the first inductor segment and an inductance value of the third inductor segment, and to set the overall inductance value of the first inductor equivalent to a combination of the inductance value of the first inductor segment, an inductance value of the second inductor segment, and the inductance value of the third inductor segment.

25. The switch circuit of claim 23, further comprising:
a compensation capacitor connected in parallel to the first inductor.

26. The switch circuit of claim 1, further comprising:
a third transistor connected in series with the second transistor to the common antenna port, the third transistor being selectively activatable in response to the second enable signal applied to the second enable line;
wherein the first, second, and third transistors have a triple-well negative field effect structure.

27. The switch circuit of claim 26, wherein the first, second, and third transistors each include a gate, a drain, and a source, the gate of the first transistor being connected to the first enable line, the gates of the second and third transistors being connected to the second enable line, the source of the first transistor being connected to the first port, the drains of the first and third transistors being connected to the antenna port, the source of the second transistor being connected to the second port, and the drain of the first transistor being connected to the source of the third transistor.

28. The switch circuit of claim 27, further comprising:
a first port decoupling capacitor connected to the first port and the source of the first transistor; and
an antenna port decoupling capacitor connected to the drain of the first transistor and the antenna port;
wherein the first port decoupling capacitor and the antenna port decoupling capacitor have respective capacitance values selected to minimize insertion loss by compensating for the first inductor.

29. The switch circuit of claim 27, further comprising:
a second port decoupling capacitor connected to the first port and the source of the second transistor; and
an antenna port decoupling capacitor connected to the drain of the third transistor and the antenna port;
wherein the second port decoupling capacitor and the antenna port decoupling capacitor have respective capacitance values selected to minimize insertion loss by compensating for the first inductor.

30. The switch circuit of claim 27, further comprising a feed-forward capacitor connected to the gate and the source of the second transistor.

* * * * *